(12) United States Patent
Zhao et al.

(10) Patent No.: US 10,460,325 B2
(45) Date of Patent: Oct. 29, 2019

(54) CUSTOMER SERVICE DASHBOARD

(71) Applicant: T-Mobile USA, Inc., Bellevue, WA (US)

(72) Inventors: Linda Zhao, Bellevue, WA (US);
Vinay Kshirsagar, Sammamish, WA (US); Nathan Bushey, Seattle, WA (US); Isaac West, Kirkland, WA (US);
Desiree Walden, Seattle, WA (US);
Robert Prouty, Issaquah, WA (US)

(73) Assignee: T-Moblie USA, Inc., Bellevue, WA (US)

( * ) Notice: Subject to any disclaimer, the term of this patent is extended or adjusted under 35 U.S.C. 154(b) by 148 days.

(21) Appl. No.: 15/433,750

(22) Filed: Feb. 15, 2017

(65) Prior Publication Data
US 2018/0232742 A1 Aug. 16, 2018

(51) Int. Cl.
*G06F 3/0482* (2013.01)
*G06Q 30/00* (2012.01)

(52) U.S. Cl.
CPC ......... *G06Q 30/016* (2013.01); *G06F 3/0482* (2013.01)

(58) Field of Classification Search
CPC ... G06Q 30/016; G06F 3/0482; G06F 3/0483; G06F 3/0484
USPC ...................................................... 715/781
See application file for complete search history.

(56) References Cited

U.S. PATENT DOCUMENTS

| | | | | |
|---|---|---|---|---|
| 5,657,462 | A * | 8/1997 | Brouwer | G06F 3/04895 715/709 |
| 7,286,656 | B2 * | 10/2007 | Castro | G06Q 30/016 345/594 |
| 8,666,929 | B2 * | 3/2014 | Jaffer | H04M 3/5191 706/62 |
| 8,776,087 | B2 * | 7/2014 | Chun | H04M 1/72522 719/318 |
| 9,514,333 | B1 * | 12/2016 | Patel | G06F 21/6245 |
| 2002/0140731 | A1 * | 10/2002 | Subramaniam | G06F 3/0481 715/762 |
| 2007/0130089 | A1 * | 6/2007 | Chiu | G06Q 30/02 705/400 |
| 2007/0214017 | A1 * | 9/2007 | Profio | A61B 6/465 705/3 |

(Continued)

*Primary Examiner* — Daniel Rodriguez
(74) *Attorney, Agent, or Firm* — Lee & Hayes, P.C.

(57) ABSTRACT

A customer service dashboard comprises an account pane and a partially surrounding administrative layer. The account pane presents information that is typically available in a customer-facing account management portal. The administrative layer presents additional content that is not typically available to customers. The administrative layer may have a menu component for selecting and navigating between customer accounts, as well as for viewing calendared items. The administrative layer may also have a module selection component for opening panes corresponding to functional modules. These modules can expose functionality relating to the current customer account. In one example, a module such as this is used for quickly navigating between interrupted tasks that are being performed in the account view. The administrative layer can be quickly hidden by selecting a visible toggle control, so that the dashboard closely replicates what would be available to and seen by a customer.

20 Claims, 19 Drawing Sheets

(56) References Cited

U.S. PATENT DOCUMENTS

| | | | | |
|---|---|---|---|---|
| 2008/0263462 | A1* | 10/2008 | Mayer-Ullmann | G06F 9/451 |
| | | | | 715/762 |
| 2009/0235194 | A1* | 9/2009 | Arndt | G06F 9/451 |
| | | | | 715/772 |
| 2009/0276400 | A1* | 11/2009 | Jaffer | G06Q 10/06 |
| 2009/0281967 | A1* | 11/2009 | Jaffer | H04M 3/5191 |
| | | | | 706/11 |
| 2009/0282106 | A1* | 11/2009 | Jaffer | G06Q 10/00 |
| | | | | 709/206 |
| 2009/0282421 | A1* | 11/2009 | Jaffer | G06Q 10/06398 |
| | | | | 719/317 |
| 2010/0269039 | A1* | 10/2010 | Pahlavan | G06F 3/0481 |
| | | | | 715/702 |
| 2012/0166244 | A1* | 6/2012 | Raj | G06Q 10/06311 |
| | | | | 705/7.13 |
| 2013/0066677 | A1* | 3/2013 | Killoh | G06Q 30/0276 |
| | | | | 705/7.29 |
| 2013/0151963 | A1* | 6/2013 | Costenaro | G06F 9/453 |
| | | | | 715/711 |
| 2013/0282844 | A1* | 10/2013 | Logan | H04L 67/02 |
| | | | | 709/206 |
| 2014/0100902 | A1* | 4/2014 | Godfrey | G06Q 30/06 |
| | | | | 705/7.13 |
| 2014/0214466 | A1* | 7/2014 | Francis | G06Q 50/30 |
| | | | | 705/7.13 |
| 2014/0257935 | A1* | 9/2014 | Killoh | G06Q 30/0276 |
| | | | | 705/7.35 |
| 2015/0077502 | A1* | 3/2015 | Jordan | H04N 7/142 |
| | | | | 348/14.03 |
| 2016/0036869 | A1* | 2/2016 | Logan | H04L 65/1083 |
| | | | | 379/265.09 |
| 2017/0104876 | A1* | 4/2017 | Hibbard | H04M 3/52 |

* cited by examiner

CUSTOMER SERVICE DASHBOARD

BACKGROUND

Companies that provide subscription-based services may provide online portals through which customers may access their customer accounts. As an example, a cellular communications company may provide an Internet website where a customer may login to not only view various information about their account, but in addition to manage their account such as by adding or removing services, making payments, changing profile information, and so forth.

Companies such as this may also have customer service agents (CSAs) with whom customers may speak to obtain account information and to request account changes. A company may provide various online or network-based portals and tools for use exclusively by CSAs when interacting with customers. For example, tools may be available to CSAs for creating and deleting accounts, for adding or deleting certain features, and so forth.

BRIEF DESCRIPTION OF THE DRAWINGS

The detailed description is described with reference to the accompanying figures. In the figures, the left-most digit(s) of a reference number identifies the figure in which the reference number first appears. The use of the same reference numbers in different figures indicates similar or identical components or features.

DETAILED DESCRIPTION

Described herein are interfaces, techniques, and systems for interacting with customers and customer service agents (CSAs) and for supporting CSAs when interacting with customers.

In described embodiments, a customer service dashboard is a composite of a customer account view and an administrative layer. The customer account view may contain largely the same information that a customer would see upon visiting an online customer-facing account management portal, and in some cases may replicate the content, including the look and feel, of an existing online customer-facing account portal.

The administrative layer may include various information and tools for use by the CSA during interaction with a customer, including information and tools that are not accessible to the customer. The administrative layer may at least partially surround the customer account view.

The customer service dashboard has various features allowing a CSA to perform different tasks, to see different types of information at the same time, and to quickly move back and forth between different tasks and information views. For example, the administrative layer may keep track of different customer accounts that have been opened by the CSA, and may present a list of such accounts so that the CSA can quickly navigate to any previously opened account. As another example, the administrative layer may have a menu section having selectable controls corresponding to different types of functional modules. Each module can be opened on top of the customer account view and may have functionality for viewing information and/or for performing management functions with respect to the customer account currently being viewed.

As another example, the administrative layer may keep track of tasks that the CSA has started but that were interrupted before completion. The administrative layer may list these interrupted tasks and may allow the CSA to quickly select and resume any one of the interrupted tasks, without requiring the CSA to re-enter information that had previously been provided.

The customer service dashboard may have an administrative toggle control which, when activated, hides the administrative layer while the account view remains visible.

This allows the CSA to view the same information that the customer might see when viewing his or her account through an online account portal.

Figure 1:
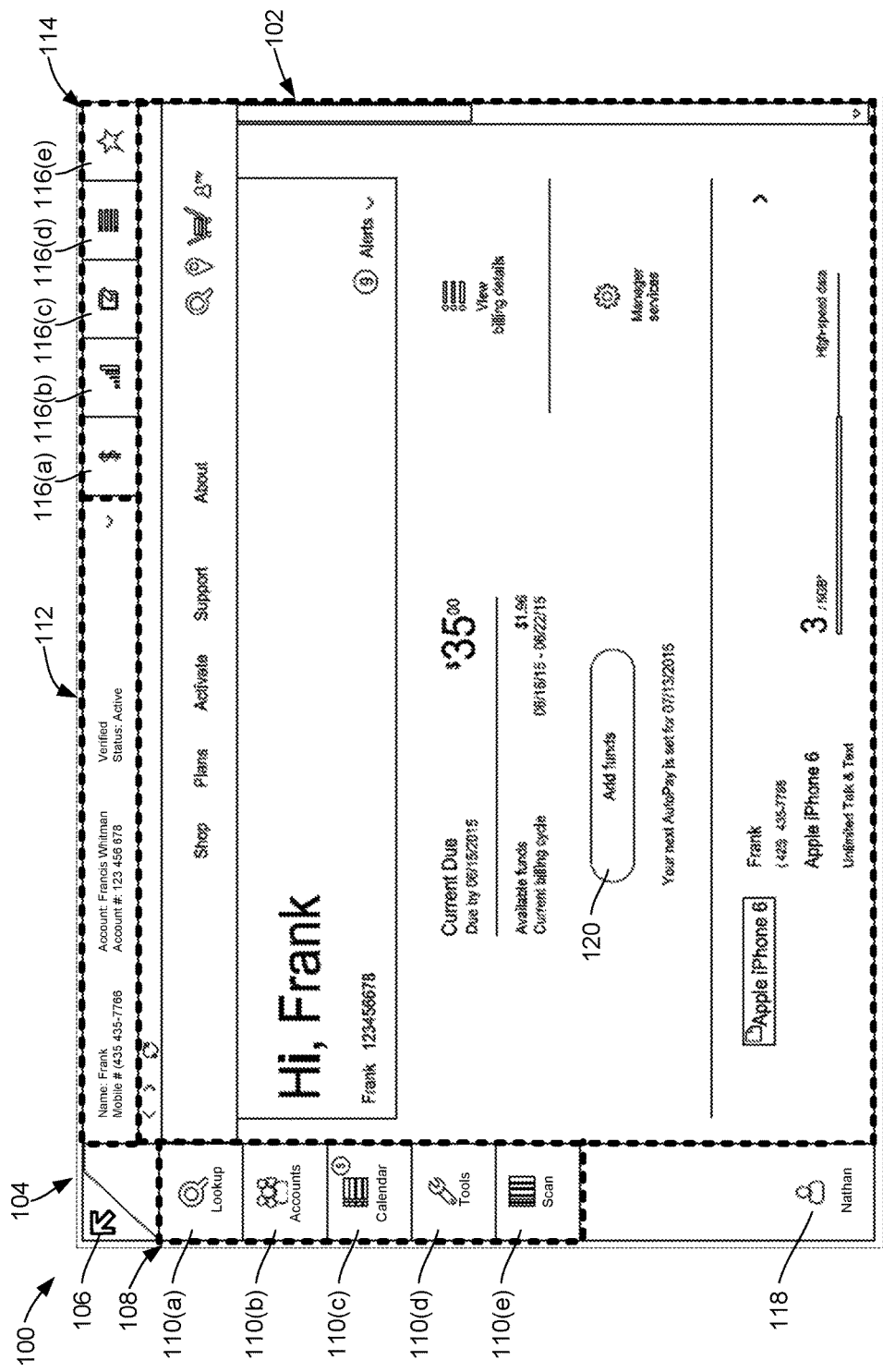
FIG. 1 is a view of a customer service dashboard in accordance with an example embodiment.

FIG. 1 illustrates an example of a customer service dashboard 100 for use by customer service agents (CSAs) when helping customers, and particularly for managing an account of a customer when speaking with the customer. The customer service dashboard 100, also referred to herein as a customer service interface, comprises a graphical user interface (GUI) that is presented on a display of any suitable device, such as a terminal, a desktop computer, a laptop computer, a tablet computer, a touch-screen terminal, a projected display surface, etc.

In some implementations, the customer service dashboard 100 is implemented by a network application and is presented within the display area of a network browser such as an HTML (hypertext markup language) browser. For example, the customer service dashboard 100 may be implemented as part of an Internet website that is accessible through an Internet browser.

When implemented as a website, the visual elements and controls of the customer service dashboard 100 may be generated by a server with which the Internet browser communicates. The server also receives and responds to user input. The user input may comprise textual input and selections of active controls that are displayed as part of the dashboard 100. Textual information may be provided by typing on a physical or virtual keyboard, by speaking, or by any other suitable input mechanisms. Active controls may be selected by moving an on-screen pointer or, in touch-screen environments, by physically touching the displayed controls.

In some implementations, the dashboard 100 may be implemented by a client application that runs on a computing device, rather than as a website. In this case, the client application generates the displayed graphical elements and communicates with a server to obtain and specify various types of data.

The customer service dashboard 100 is designed for use by CSAs of a company that maintains accounts for multiple customers. The examples illustrated and described herein are for use particularly by CSAs of a mobile telecommunications company such as a cellular services provider. However, similar components and concepts can be adapted for use by many different types of companies, which may provide many different types of goods and services for customers. The various examples described herein may be modified appropriately to present the content that is suitable for different types of accounts, which may be maintained by different types of companies.

In certain implementations, the customer service dashboard 100 may occupy the entire display area or nearly the entire display area of a device used by a CSA, such as when the CSA is using a tablet having a limited display area or having limited multitasking capabilities. For example, many tablet computers allow only a single application to be visible at any given time. The customer service dashboard 100 may be particularly useful in such an environment, as it can concurrently display several different content panes and has facilities for quickly and conveniently switching between different accounts and tasks.

Generally, the customer service dashboard 100 presents content relating to a customer account. The customer service dashboard 100 is used by a user, which in the described embodiment comprises a CSA, when the user is speaking or otherwise communicating with a customer, in order to manage an account of the customer. The customer service dashboard may also be used at times other than when speaking with customers. Account management may involve various activities, such as making or receiving payments, modifying customer information, adding/removing/modifying provided services, applying or offering promotional discounts, etc.

During a conversation with a customer, the CSA may ask the customer for identifying information such as an account number, and may provide that information using the customer service dashboard 100. In response, the customer service dashboard 100 opens the account of the customer, and information regarding the customer account is shown in the various parts of the customer service dashboard as will be described. In the described embodiment, the customer service dashboard 100 focuses on and displays content for one customer account at any time, as directed by input from the CSA. This customer account is said to have the focus of the customer service dashboard 100. The CSA can specify different customer accounts at different times, which causes the customer service dashboard 100 to change its focus among the different customer accounts. As will be described in more detail below, the customer service dashboard allows the CSA to easily switch between different customer accounts, and to resume management of each account at the point where it was left off.

The customer service dashboard 100 displays various content as will be described in more detail below. Generally, the term "content" may include text, graphical elements, and/or various types of active controls that are used to accept input from a user such as the CSA. Content may be represented, communicated, and/or formatted using a markup language such as HTML (hypertext markup language) as well as using other technologies and programming languages such as Java, Javascript, ActiveX, and so forth.

The customer service dashboard 100 in this example has several different areas, which may be referred to at times as panes or tiles. Different areas are delineated by heavy dashed lines in FIG. 1 for purposes of illustration.

In the illustrated embodiment, the customer service dashboard 100 is a composite of what will be referred to as a customer account view 102 and an associated graphical administrative layer 104. At times, the customer service dashboard 100 may be referred to as a graphical customer service interface. The customer account view 102 may be referred to as a graphical customer interface. The administrative layer 104 may be referred to as a graphical administrative interface.

The account view 102 is a pane that occupies the largest portion of the customer service dashboard 100. The account view 102 is a representation of a customer-oriented website that customers may otherwise access to manage their own accounts, and/or may replicate the content that is available to a customer through an online customer portal. The account view 102 is presented within the customer service dashboard 100 so that the CSA can view information and perform tasks on behalf of a customer using the same views and tools that are available to a customer. In many cases, this can improve communications and understanding between the CSA and customers, and may save time as the CSA tries to understand customers' needs and objectives.

In the described implementation, the account view 102 maintains the same layout and graphical elements that are present in the customer-oriented website. In some implementations, the account view 102 may comprise an actual instance of the customer-oriented website or portal, embedded as an HTML frame within other content of the customer service dashboard 100.

The administrative layer 104 is a set of additional elements, providing information and functionality that is not necessarily available to the customer. Some of this additional information and functionality relates to navigation within the dashboard 100. The additional information and functionality may also include information regarding customer accounts, some of which may not be available to customers. The additional information and functionality may also include account management functions that are provided for use by CSAs, but which may not be available to customers through the account view 102.

FIG. 1 shows an example page of information that might be displayed within the account view 102. The information relates to a specific customer account that the CSA has opened. An account is opened and given focus by providing an identification of the account, such as an account number, and engaging in some sort of verification or authentication with the customer. The CSA can interact with elements of the account view 102 to navigate to different pages, and to perform different activities on behalf of the customer. Navigation within the account view 102 does not for the most part affect the content of the administrative layer 104. That is, the administrative layer 104 generally remains static while the CSA navigates within the account view 102.

The administrative layer 104 partially surrounds the account view 102, in this example on the left and top sides of the account view 102. The customer service dashboard 100 is thus a composite of the account view 102 and the administrative layer 104.

The customer service dashboard 100 has a navigational toggle 106 in the upper left corner, represented as an arrow, which can be selected to expand the account view 102 and to hide the administrative layer 104.

Figure 2:
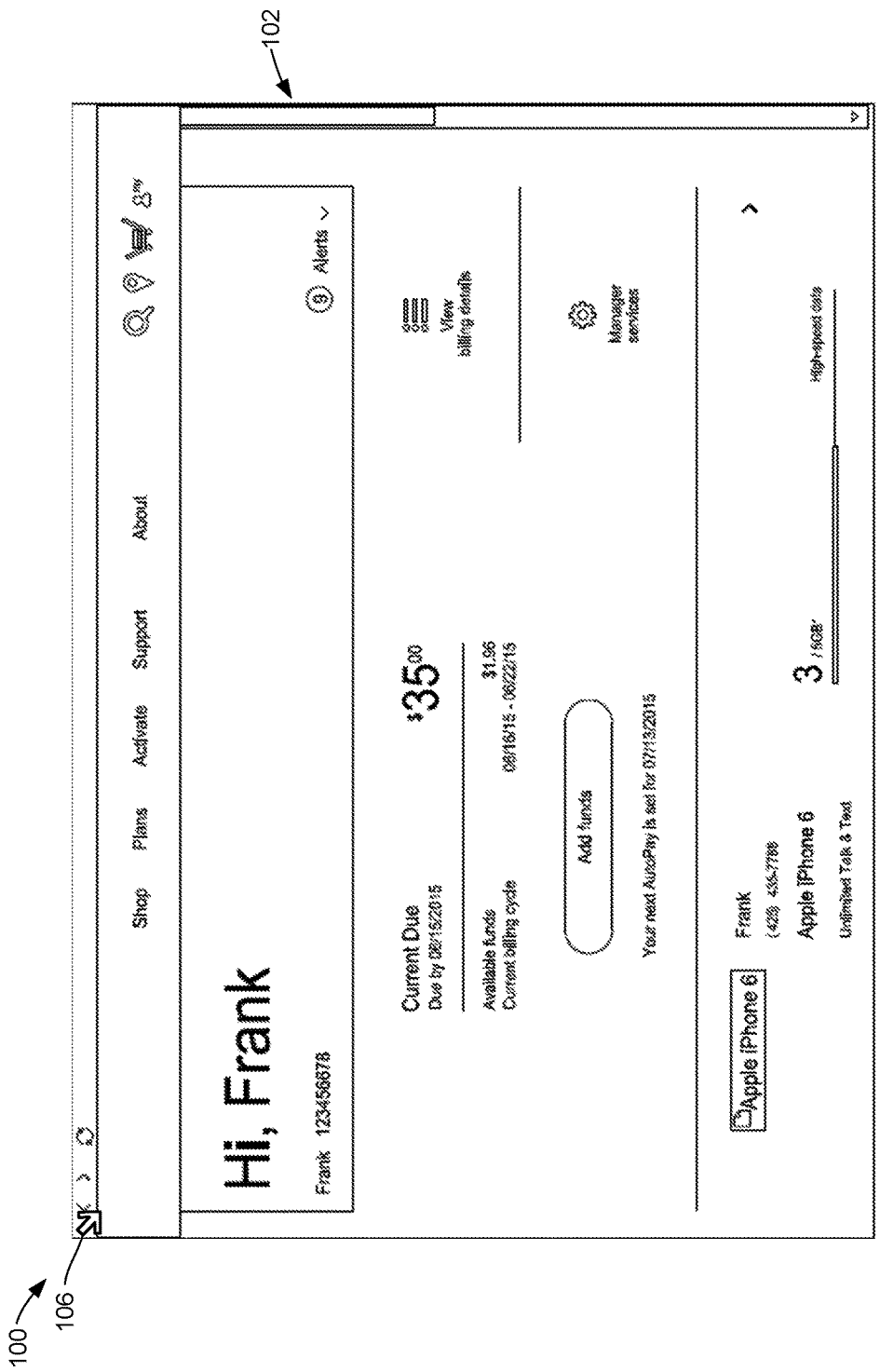
FIG. 2 is a view of the customer service dashboard of FIG. 1, further illustrating operation of a navigational toggle.

FIG. 2 shows an example of the customer service dashboard 100 when the administrative layer 104 has been collapsed or hidden by selecting the navigational toggle 106. A reversed version of the toggle 106 remains visible, and can be selected again to unhide the administrative layer 104.

Hiding the administrative layer 104 in this manner may also modify elements of the displayed account view 102. Specifically, anything in the account view 102 that is not available to customers becomes hidden, so that the account view 102 appears just like it would be if a customer were viewing it through an online, customer-facing account management portal. This feature may be useful in situations in which the account view 102 has certain elements that are visible depending on the permission or authorization level of the current user. Administrators such as CSAs may have higher permission levels, which causes the customer interface to display certain additional content. This additional content is hidden when the administrative layer 104 is hidden.

Returning to FIG. 1, the administrative layer 104 exposes information, tools, and functionality that are available primarily to administrative personnel such as CSAs, and at least some of which are not available to customers. The administrative layer 104 has an administrative menu component 108 comprising multiple selectable menu controls 110 that are aligned in a column along the left side of the customer service dashboard 100. When selected, the menu controls 110 open fly-out panels or panes, each of which exposes functionality that for the most part is not specific to the customer account shown in the account view 102. For example, the menu controls 110 allow a CSA to look up a customer account and open the account view 102 to a landing page corresponding to the customer account, to view a list of multiple accounts with which the CSA is currently working, to manage calendared tasks or reminders, to scan barcodes or other identifiers of items that a customer is purchasing, etc.

More specifically, in the described embodiment the menu controls 110 comprise a lookup control 110(a), an accounts control 110(b), a calendar control 110(c), a tools control 110(d), and a scan control 110(e). Examples of the lookup control 110(a), the accounts control 110(b), and the calendar control 110(c) will be described in FIGS. 3-5 below. Selection by the CSA of the tools control 110(d) opens a pane (not shown) from which the CSA may select from various tools that are external to the customer service dashboard 100, such as tools for retail store operations, as an example. The scan control 110(e) can be selected to open functionality for scanning barcodes of retail items that are being purchased by a customer. Scanned items will be put into the shopping cart of the currently focused account.

The administrative layer 104 also has an account snapshot component 112 that occupies a rectangular region along the top of the customer service dashboard 100. The account snapshot component 112 shows summarized or high-level information about the customer account that has the current focus of the customer service dashboard 100. In some embodiments, a particular customer account may be associated with multiple lines of service, and the information shown in the account snapshot component 112 be for one of these lines, depending on the navigation of the customer within the account view 102.

The administrative layer 104 also has a module menu component 114 along the top of the customer service dashboard 100. The module menu component 114 has multiple selectable menu controls 116. When selected, each menu control 116 opens a corresponding module pane (not shown in FIG. 1) that overlays the account view 102. More than one such module pane may be open at any given time, and each module pane may be dynamically repositioned by the CSA over and relative to the account view 102. The functionality of these module panes is for the most part directed to the currently focused customer account. For example, the menu controls 116 may correspond to modules for customer cost summaries, customer-related memos and follow-ups, customer-specific activity logs, and links to in-progress activities. However, modules may also be provided for other purposes, and may not always relate directly to the account that is currently in focus.

The administrative layer 104 has a control 118 at the lower left corner of the dashboard 100, which identifies the currently logged in user (the CSA in the described embodiments). The control 118 can be selected to log the current user out of the dashboard 100.

Figure 3:
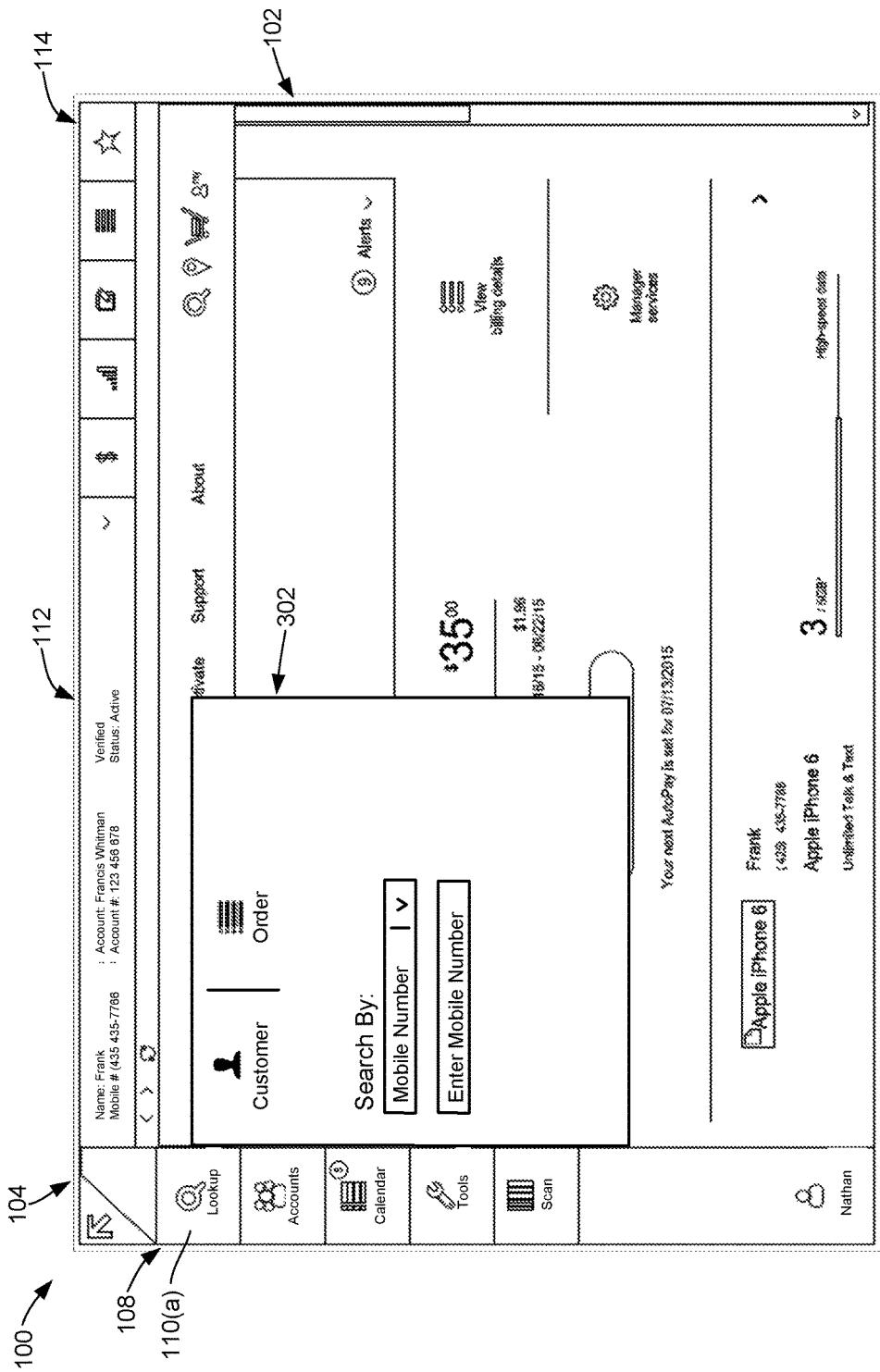
FIG. 3 is a view of the customer service dashboard of FIG. 1, further illustrating a fly-out panel corresponding to a lookup menu control.

FIG. 3 shows an example of a fly-out panel 302 corresponding to the lookup control 110(a) of the menu component 108. The lookup fly-out panel 302 opens when the user of the dashboard 100 selects the lookup control 110(a).

The lookup fly-out panel 302 can be opened by the user at any time to search for and open a particular customer account, thereby giving the focus of the customer service dashboard 100 to that customer account. The nature or mechanism of searching and selection can vary. In the example shown, the CSA can elect to search using different information corresponding to the customer, such as mobile number (shown), email address, social security number, account number, etc. The illustrated lookup fly-out panel 302 also has an option allowing the CSA to search for customer orders, such as by providing an order number.

Upon entering search criteria, the lookup fly-out panel 302 will show one or more accounts that satisfy the search criteria. The user can select one of the accounts, and in response the account view 102 automatically navigates to the account landing page corresponding to the selected account, giving the focus of the customer service dashboard 100 to the selected customer account.

Figure 4:
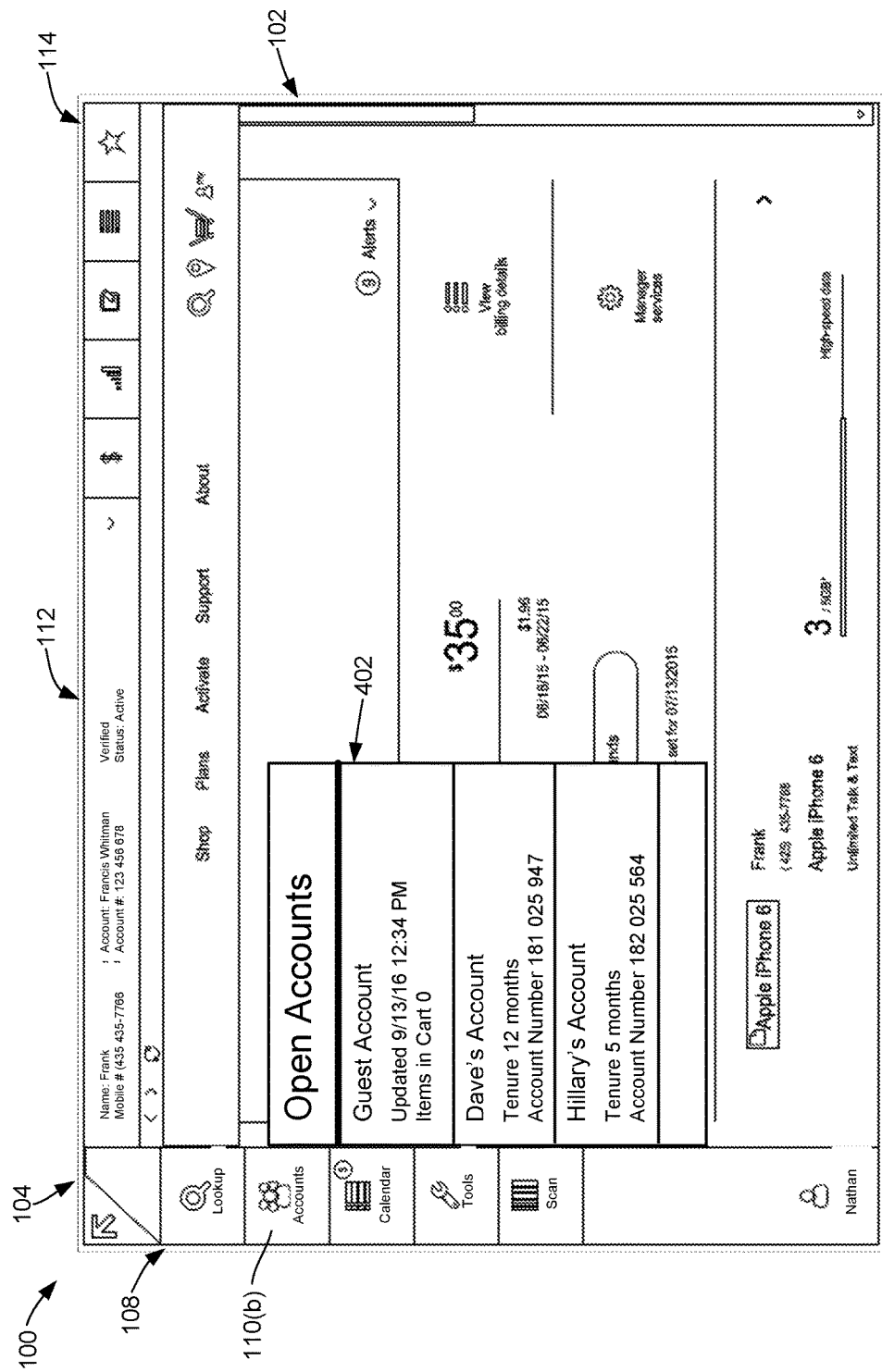
FIG. 4 is a view of the customer service dashboard of FIG. 1, further illustrating a flyout panel corresponding to an accounts menu control.

FIG. 4 shows an example of a fly-out panel 402 corresponding to the accounts control 110(b) of the menu component 108. The accounts fly-out panel 402 opens when the user selects the accounts control 110(b).

The accounts fly-out panel 402 can be opened by the user at any time to see a list of customer accounts that the user has previously opened and has not yet closed or logged out of. The panel 402 may show descriptive or identifying information about each open account, such as the account owner's name, the account number, and/or other information.

A user can select any one of the listed accounts, and that account will be given focus by the customer service dashboard 100. When an account is given focus in the manner, the account view 102 resumes displaying account information for the selected account at the last viewed page of that account.

The accounts fly-out panel 402 also supports what is referred to as a "guest" account, which allows for operations that do not have a corresponding customer account. For example, the guest account may be used when selling a product to a customer who doesn't have an account, or when opening an account for a new customer before the customer has an account.

Figure 5:
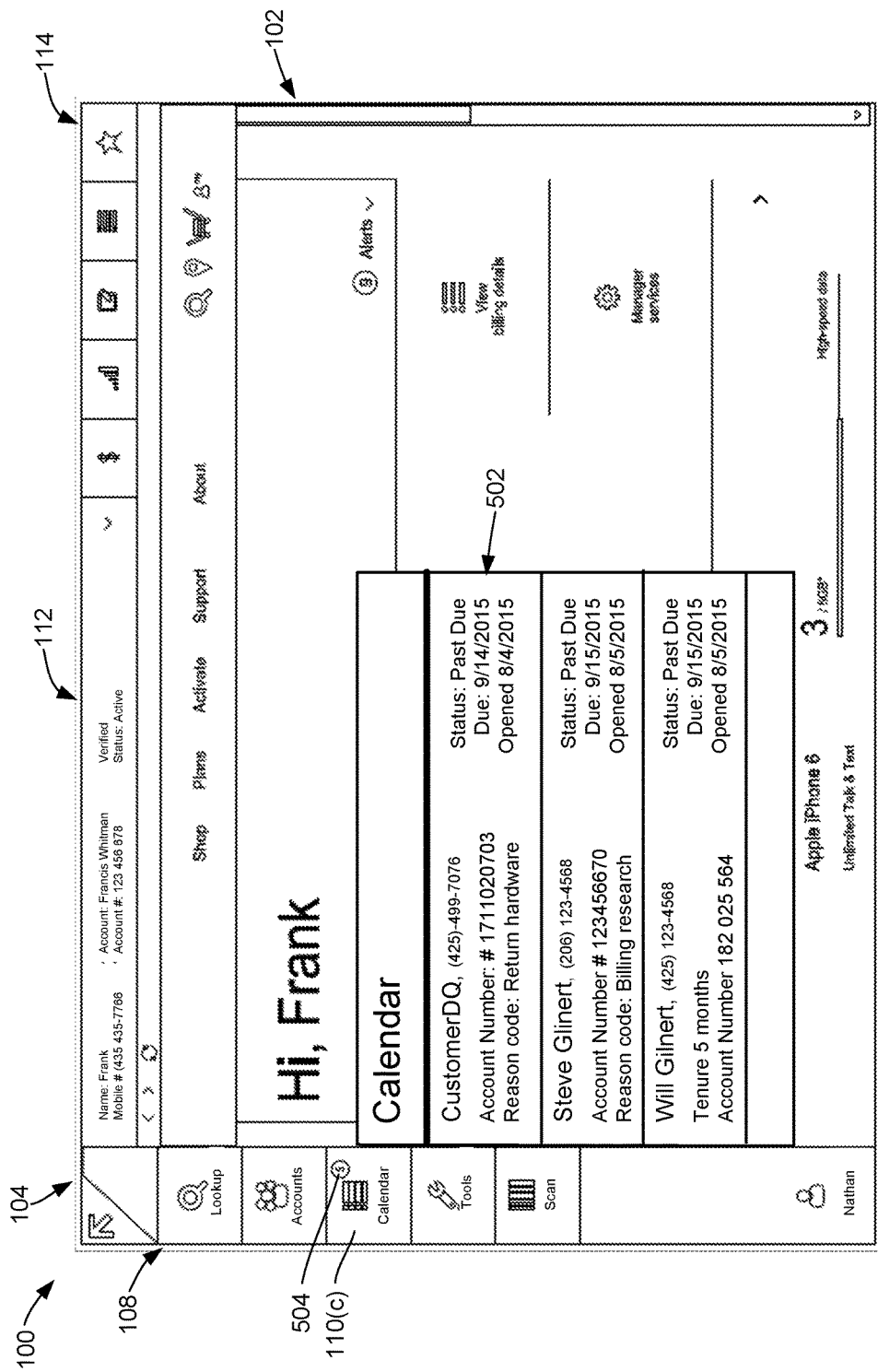
FIG. 5 is a view of the customer service dashboard of FIG. 1, further illustrating a flyout panel corresponding to a reminder menu control.

FIG. 5 shows an example of a fly-out calendar panel 502 corresponding to the calendar control 110(c) of the administrative menu component 108. The calendar panel 502 opens when the user selects the calendar control 110(c).

As will be described below, the customer service dashboard 100 allows a CSA to create multiple events such as tasks and reminders. Each calendared event specifies an action or description and has an associated date, which may comprise a due date. The calendar panel 502 can be opened to show a list of currently due tasks or reminders for the CSA. The calendar panel 502 can also be configured for a supervisor, to show the calendar items of CSAs who report to the supervisor. The calendar items can also be filtered in various ways such as by date, priority, responsible person, type of event, etc. The calendar panel 502 may show various information about each event, such as the information relating to the account to which the event relates, text associated with the event, the nature of the task or reminder, the due date, the date the event was created, the status of the event, etc.

The calendar control 110(c) may have an associated indicator 504 that shows the number of events that are currently due or overdue.

Figure 6:
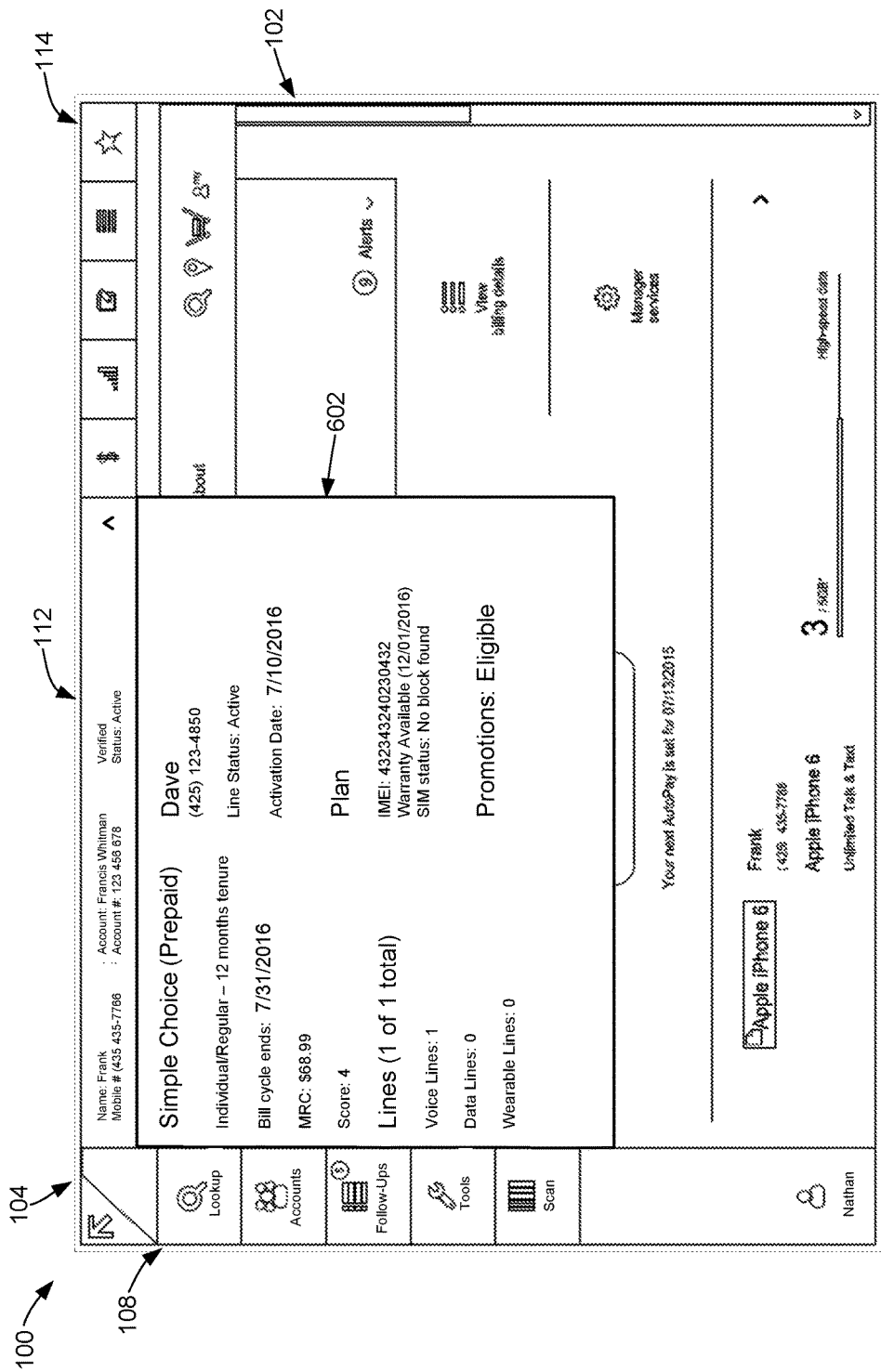
FIG. 6 is a view of the customer service dashboard of FIG. 1, further illustrating an account detail pane.

FIG. 6 shows illustrates further details regarding the account snapshot component 112. The account snapshot component 112 displays information relating specifically to the account and/or customer that is currently in focus. In this example, this information includes the account number, the name of the account or account holder, the mobile telephone number of the account holder, and limited account status information. In cases where the customer account is associated with more than one line of service, the account snapshot component may display information for the service line that currently has the focus of the account view 102.

The account snapshot component 112 can be selected to display an account detail pane 602, containing additional account details. The account detail pane 602 opens over the account view 102.

Figure 7:
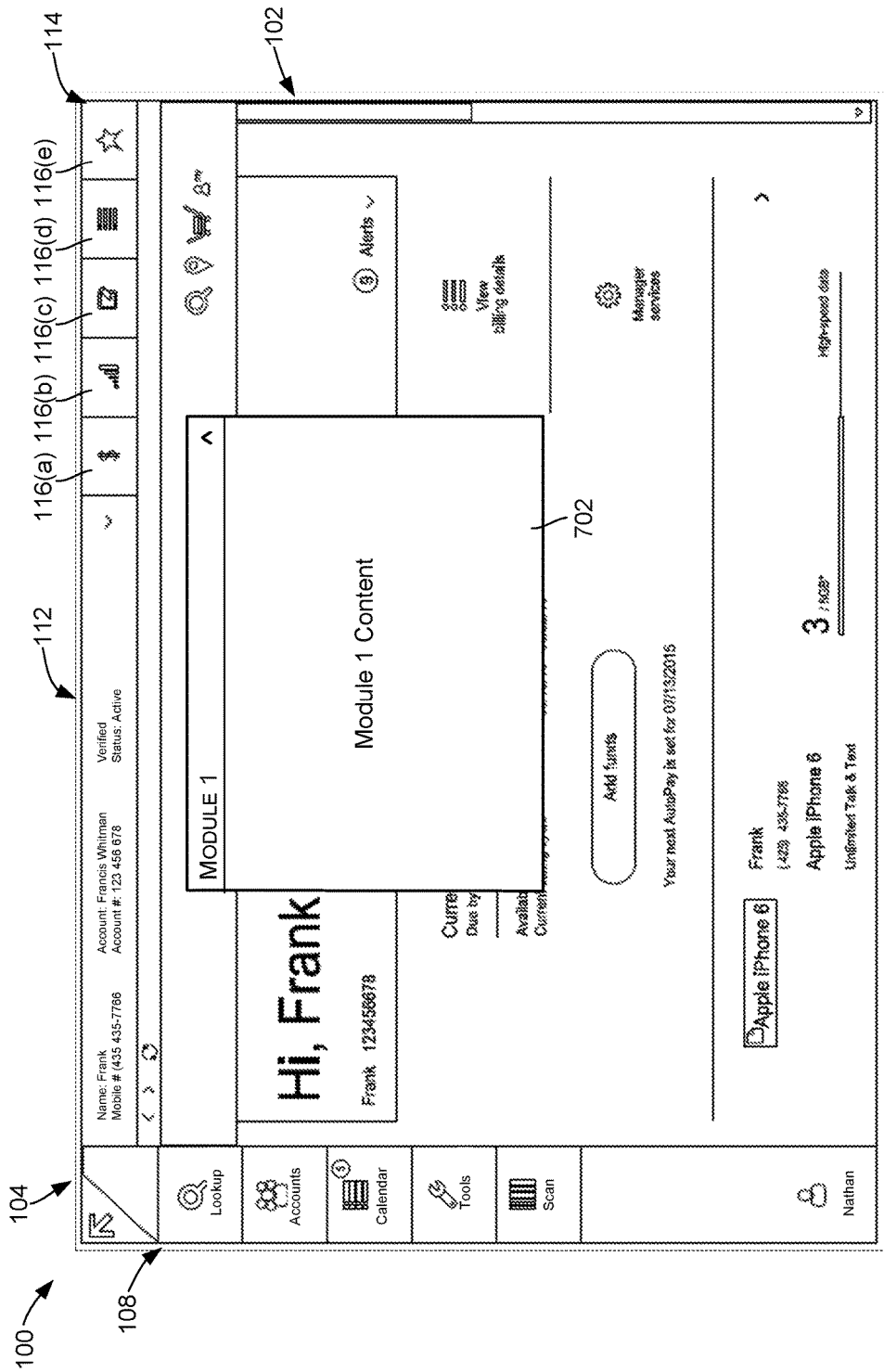
FIG. 7 is a view of the customer service dashboard of FIG. 1, further illustrating an example of a repositionable module pane.

FIG. 7 illustrates an example of a module pane 702 that has been opened in response to the user selecting one of the menu controls 116. The module pane contains content designed to perform a particular task and/or to display particular information, depending on the purpose of the module pane. The module pane 702 can be closed by selecting the same menu control 116 again.

Figure 8:
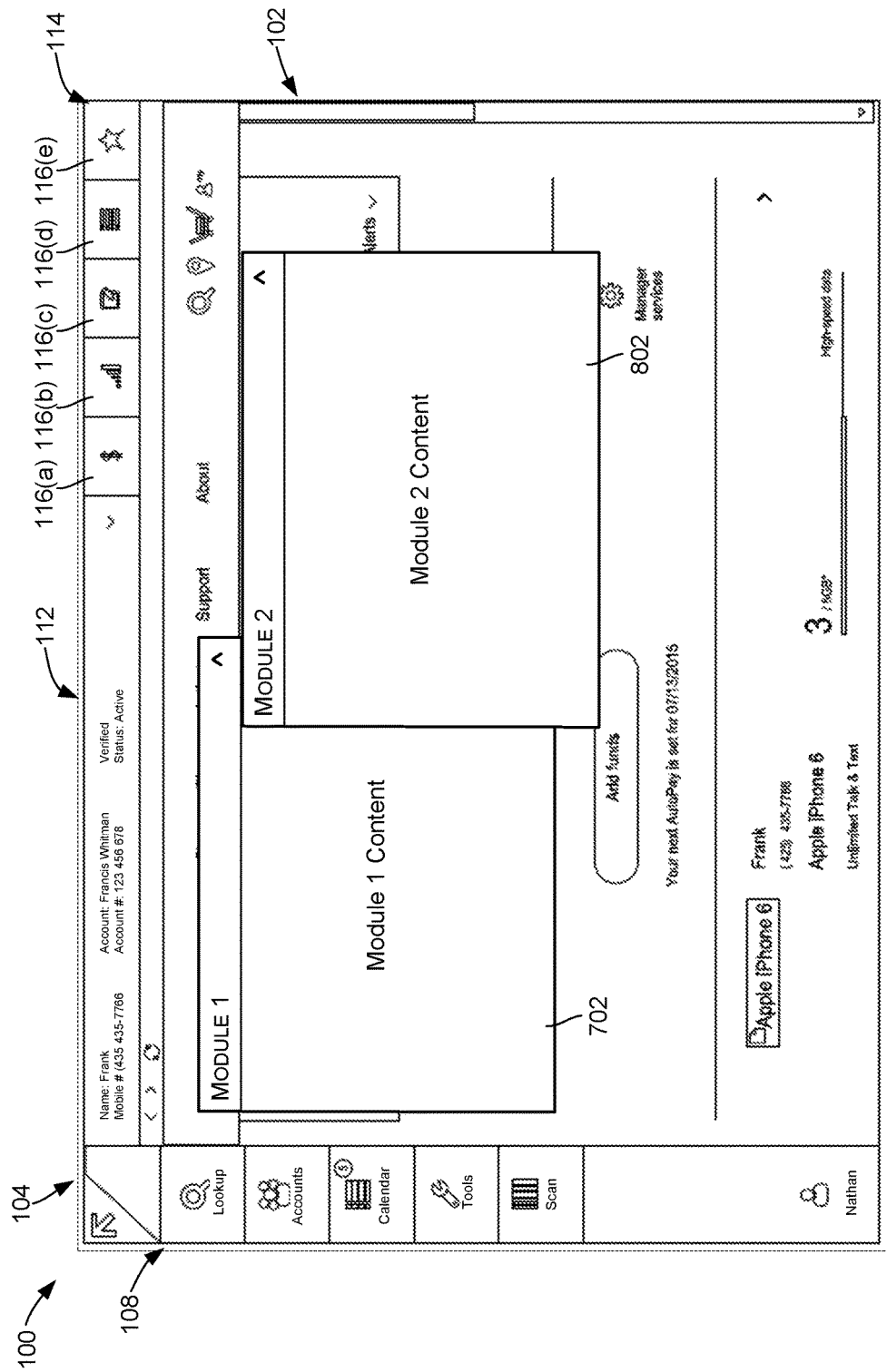
FIG. 8 is a view of the customer service dashboard of FIG. 1, further illustrating an example in which multiple repositionable module panes have been opened.

FIG. 8 illustrates an example in which a second module pane 802 has been opened in response to the user selecting another one of the menu controls 116. Any number of module panes may be concurrently open. Each open module pane overlays the account view 102 and can be dynamically repositioned by the user by dragging it across the account view 102. Module panes can be arranged by the user to partially overlay each other as shown. By selecting within a module pane, that module pane is given focus and is moved visually to the top, overlaying the other open module panes.

Figure 9:
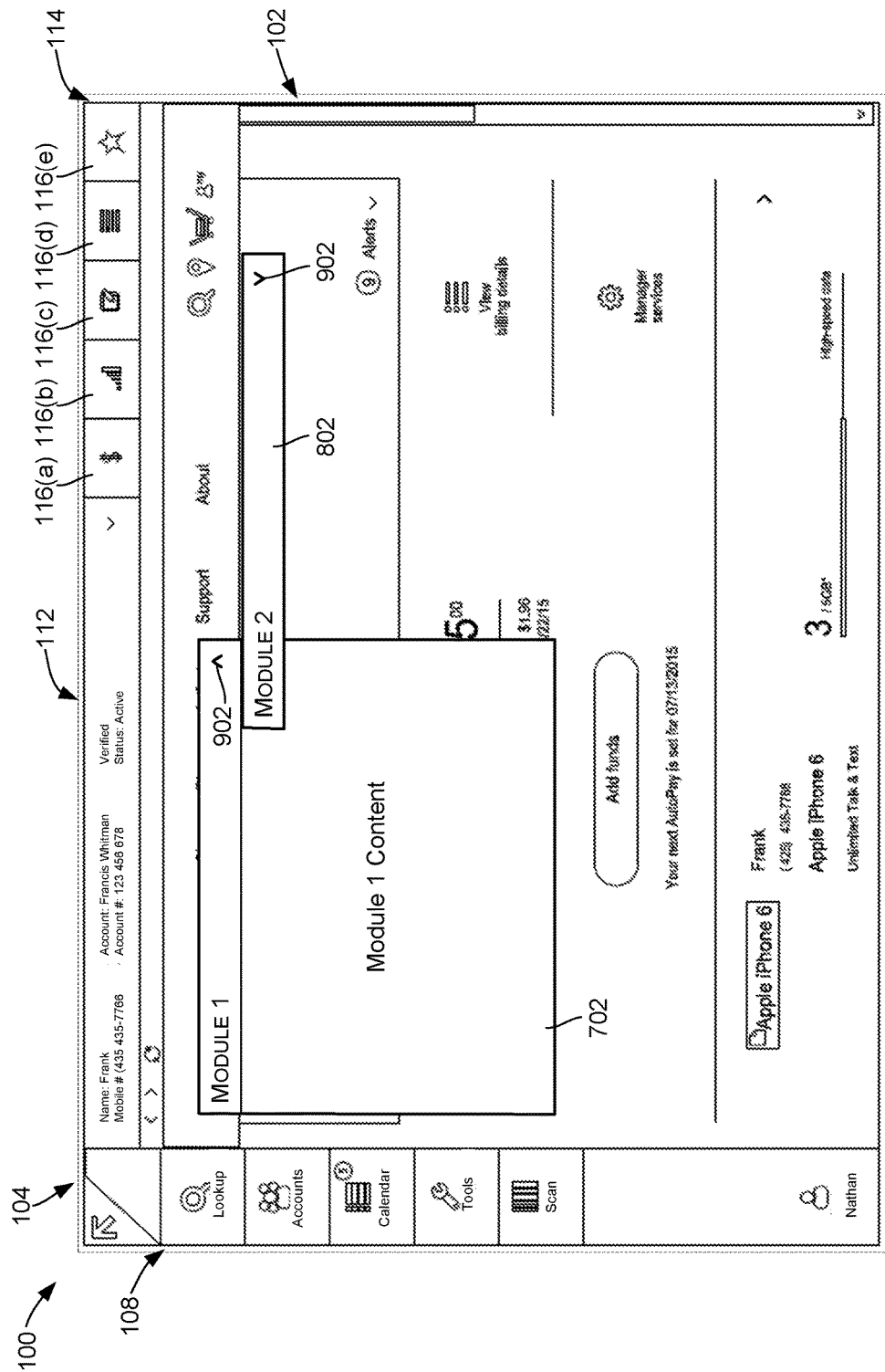
FIG. 9 is a view of the customer service dashboard of FIG. 1, further illustrating collapsibility of a repositionable module pane.

FIG. 9 shows that any module pane can be partially collapsed, by selecting a control 902 in the upper right corner of each pane. A collapsed module pane can be expanded by again selecting the control 902.

Module panes such as these provide the ability to present multiple different types of information and functionality relating to the currently focused customer account. The content of the account view 102 remains active while the module panes are displayed, so that a CSA can continue to interact with the account view 102, with the advantage that additional information can be viewed from one or more module panes while working within the account view 102. In addition, as will be described below, a module pane may be provided for allowing the CSA to quickly navigate between tasks that are being performed with respect to a particular customer account.

Generally, module panes may be designed to provide any desired content, including any desired information and functions. Each module pane may focus on a particular type of content and/or functionality, and may be used to provide supplemental information and controls to the CSA without impeding the ability of the CSA to perform account management tasks through the account view 102.

Figure 10:
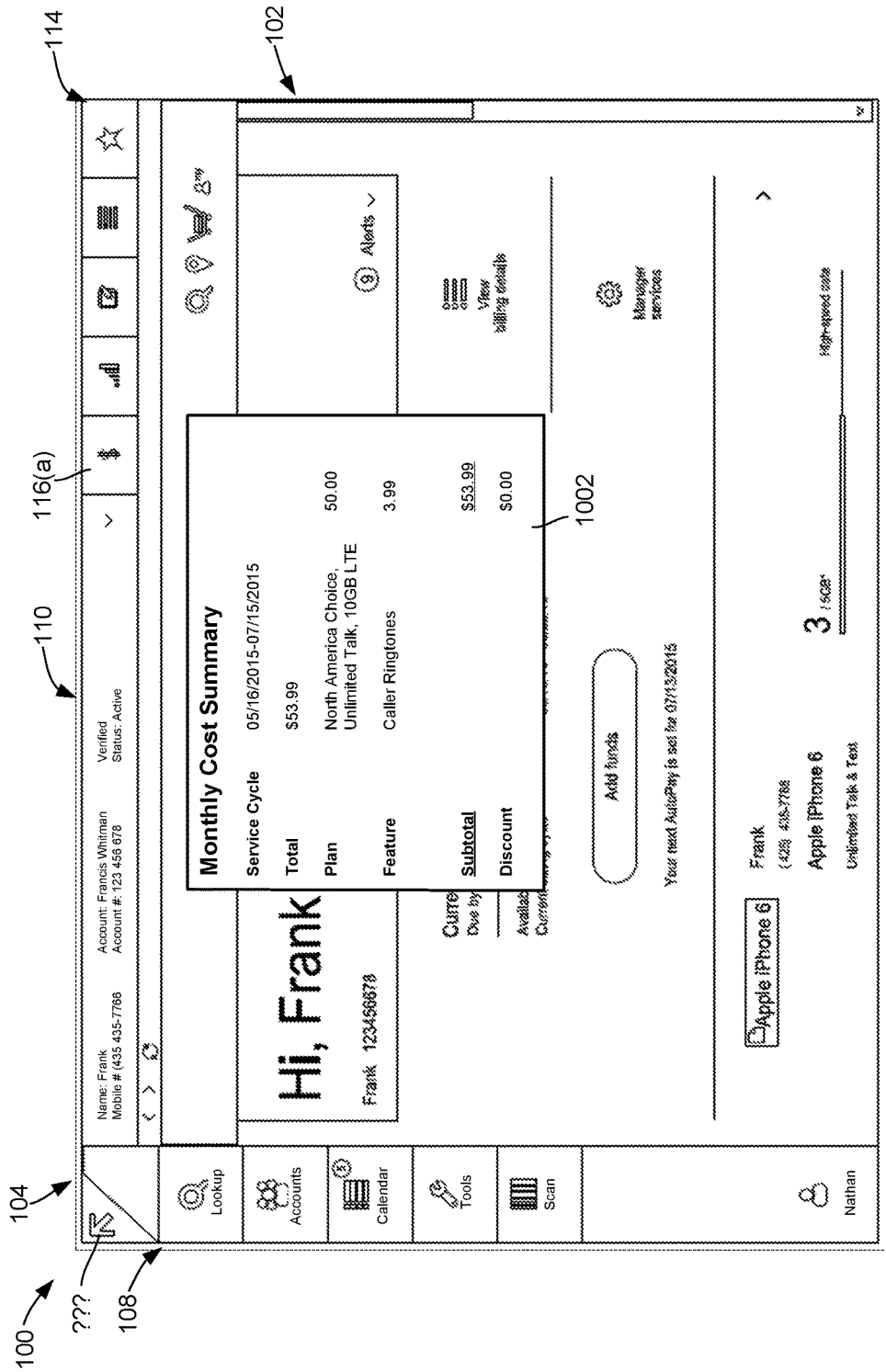
FIG. 10 is a view of the customer service dashboard of FIG. 1, further illustrating an example customer cost summary module pane.

FIG. 10 shows an example of a customer cost summary module pane 1002, which is opened in response to the user selecting a corresponding cost summary menu control 116(a). The content of the cost summary module pane 1002 can be configured to show details for the customer account that is currently in focus.

Figure 11:
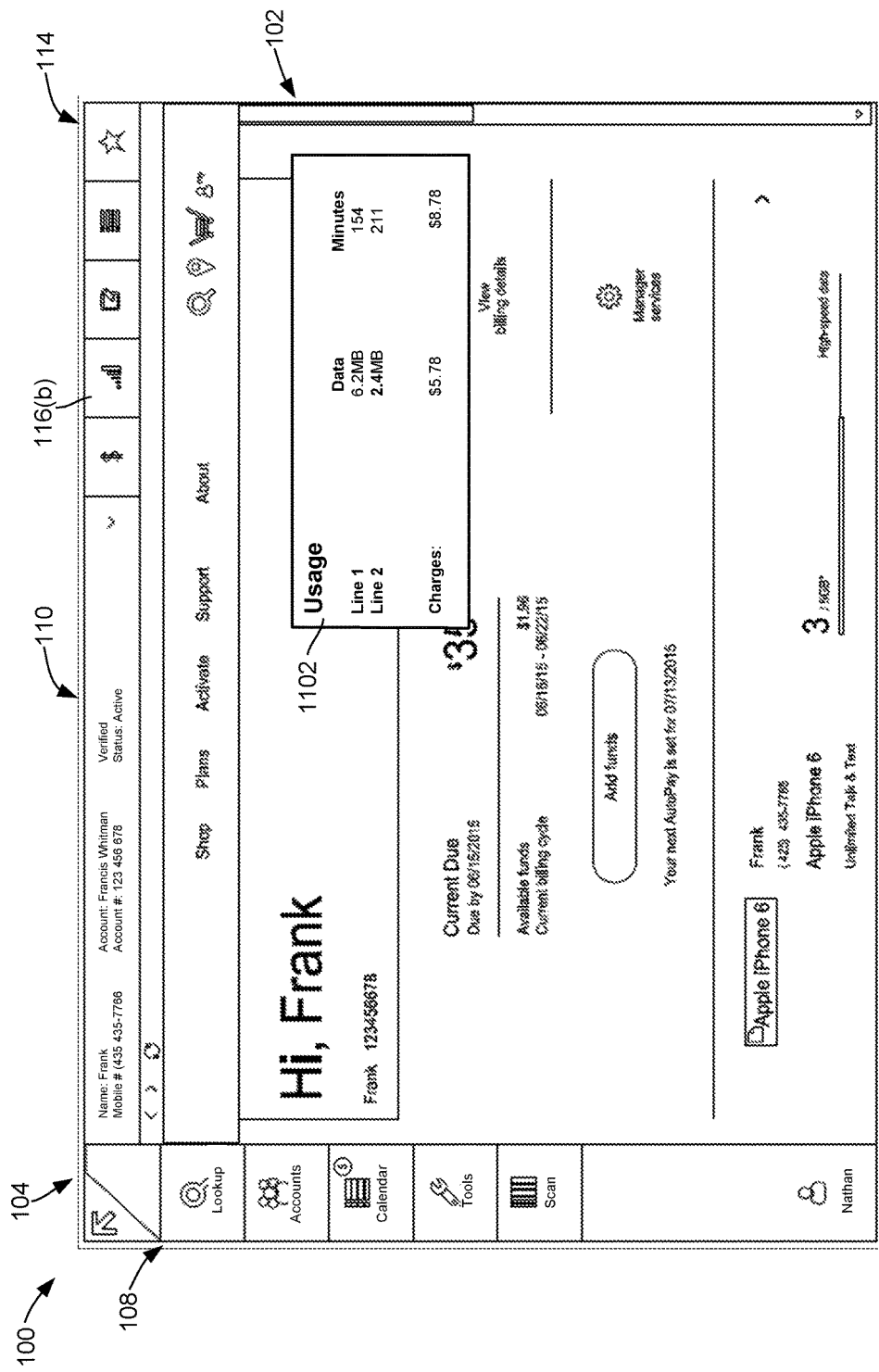
FIG. 11 is a view of the customer service dashboard of FIG. 1, further illustrating an example customer usage summary module pane.

FIG. 11 shows an example of a customer account usage summary module pane 1102, which is opened in response to the user selecting a corresponding usage menu control 116(b). The content of the usage summary module pane 1102 includes details for the customer account that is currently in focus.

Figure 12:
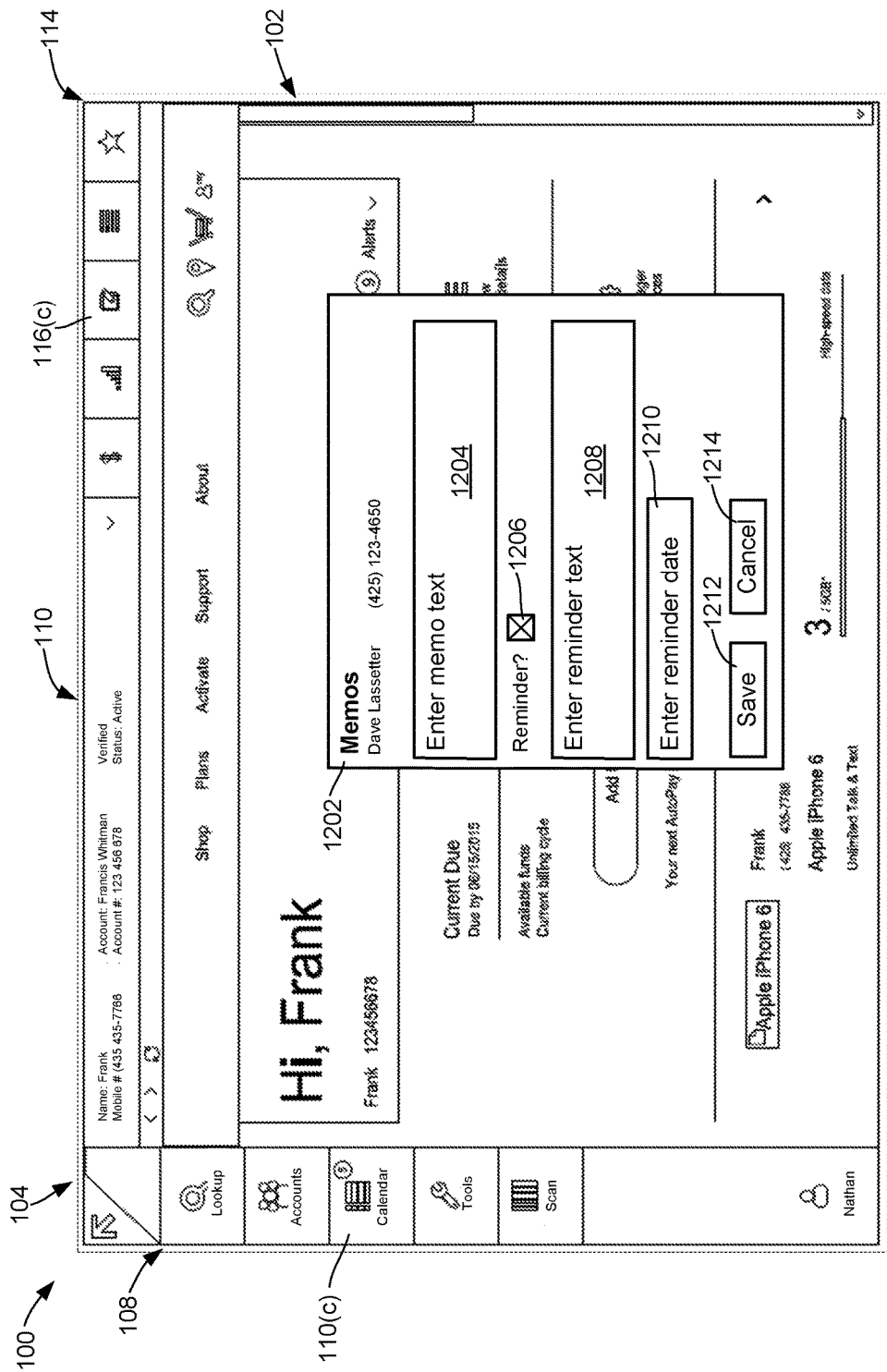
FIG. 12 is a view of the customer service dashboard of FIG. 1, further illustrating an example memos and reminders module pane.

FIG. 12 shows an example of a memos and reminders module pane 1202, which is opened in response to the user selecting a corresponding memos menu control 116(c). The memos and reminders module pane 1202 has active controls that may be used by the user to enter memos regarding the currently focused customer account and to also set reminders for subsequent display in conjunction with the calendar control 110(c). Specifically, the memos and reminders module pane 1202 has a text entry control 1204 into which the user can enter a memo regarding the currently focused customer account. A checkbox control 1206 is used by the user to indicate whether a reminder should be associated and saved with the memo. A text entry control 1208 is used to enter text for a reminder. A date control 1210 is used to enter a due date for the reminder, or a date upon which the reminder should be included in the fly-out pane associated with the calendar control 110(*c*). A save button 1212 can be selected to save both the entered memo and the reminder. A cancel button 1214 can be selected to discard any information that has been entered in the memos and reminders module pane 1202, without saving a memo or reminder.

Figure 13:
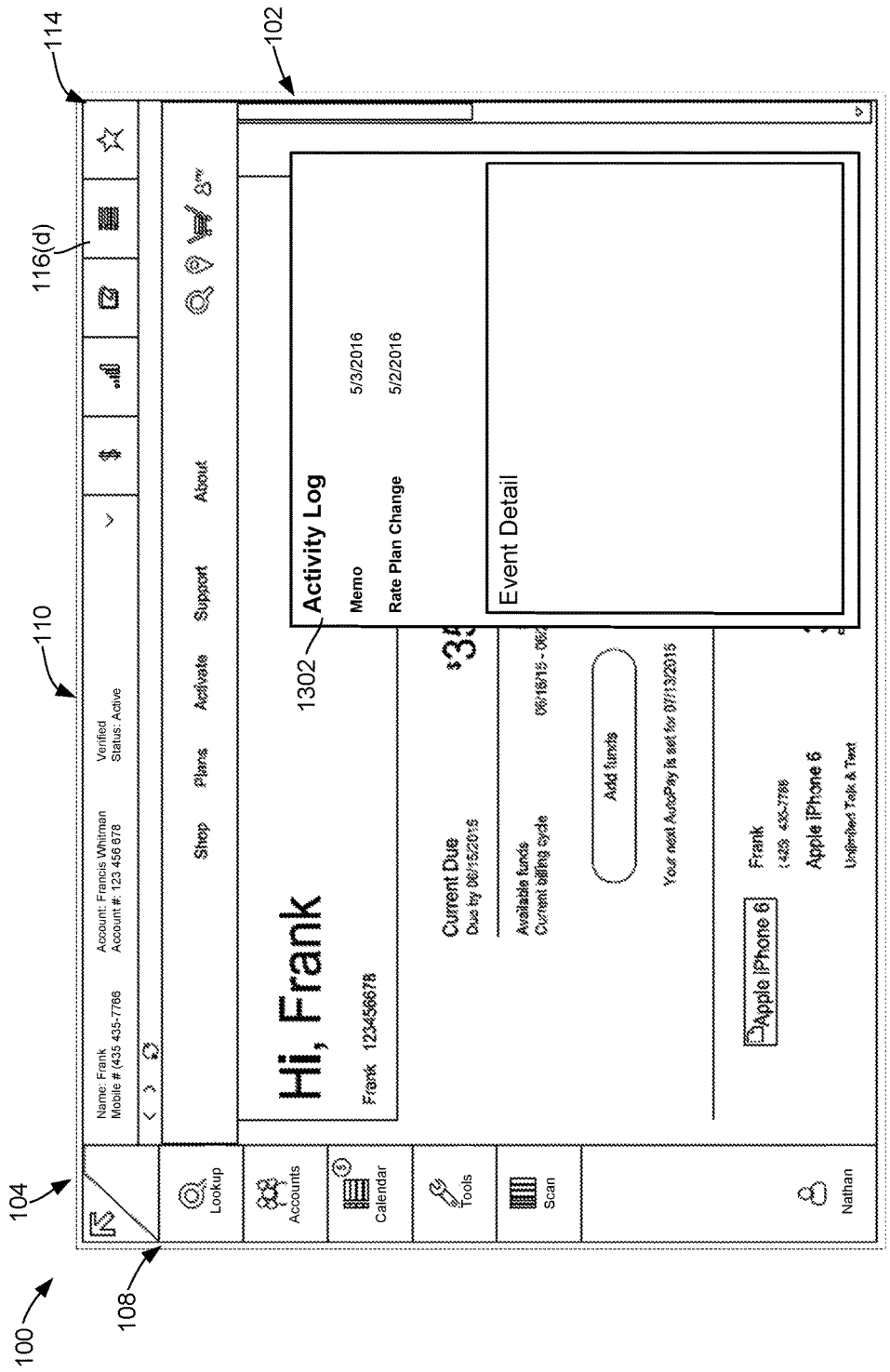
FIG. 13 is a view of the customer service dashboard of FIG. 1, further illustrating an example activity log module pane.

FIG. 13 shows an example of an activity log module pane 1302, which is opened in response to the user selecting a corresponding activities menu control 116(*d*). The content of the activity log module pane 1302 can be configured to show details of events related to the currently focused customer account. Events may include memos, reminders, account changes, and so forth.

Figure 14:
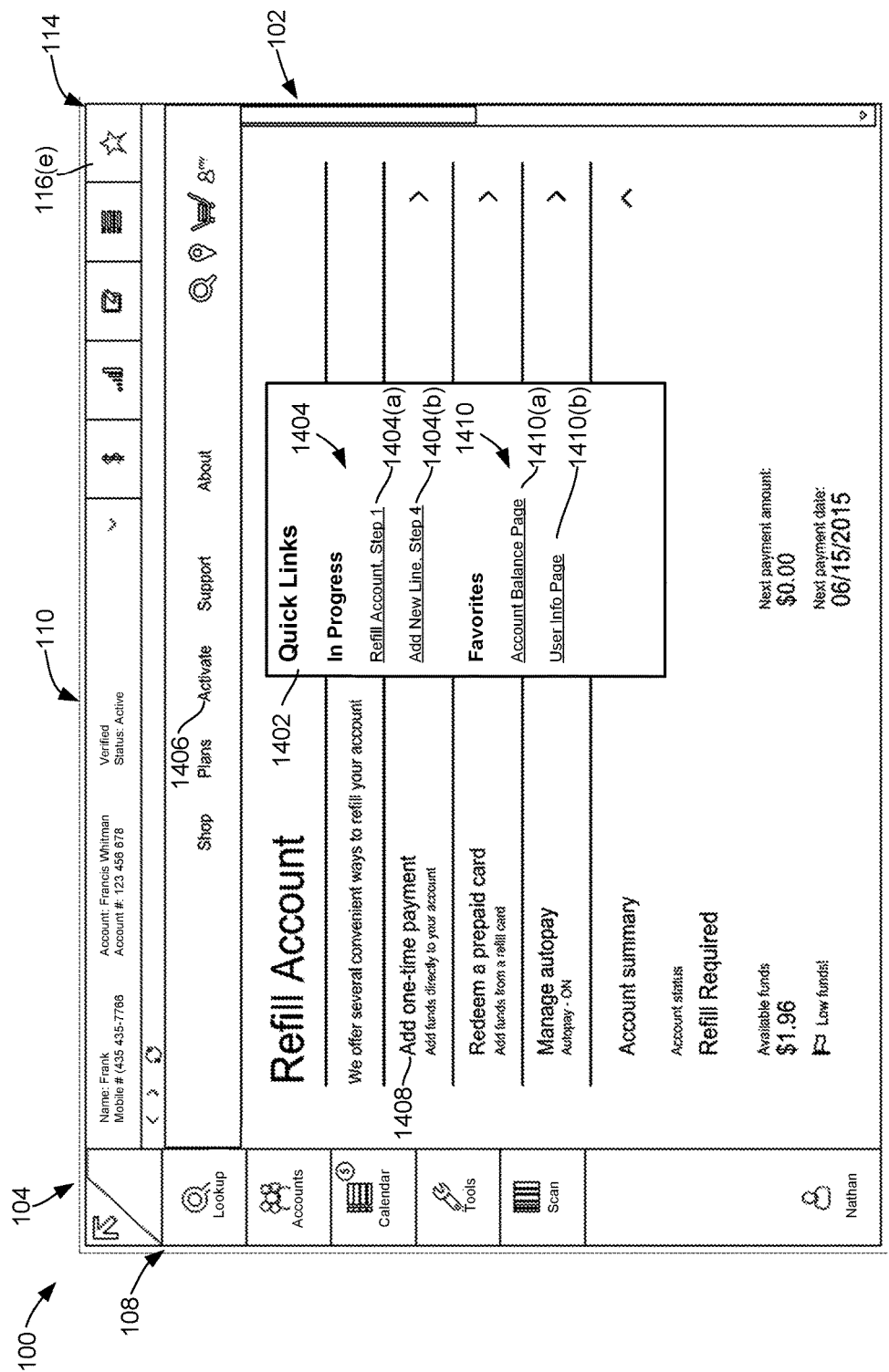
FIG. 14 is a view of the customer service dashboard of FIG. 1, further illustrating an example quick links module pane.

FIG. 14 shows an example of a quick links module pane 1402, which is opened in response to the user selecting a corresponding activities menu control 116(*e*). In this example, the user has navigated within the account view 102 to the first step of a multi-step account management task that is available through the account view 102. More specifically, the user has navigated to and partially completed a task for adding funds to a customer account. To reach this state, the CSA selected the "Add Funds" control 120 (FIG. 1) in order to initiate the process of paying a bill or otherwise adding funds to the customer account on behalf of the customer. In response to this selection, the account view 102 has displayed new content, representing the first of multiple sequential steps or pages for adding funds, which in this example involves "refilling" the customer account.

The quick links module pane 1402 presents an in-progress task list 1404 of one or more active and/or previously active multi-step account management tasks that the user has initiated but has not completed. A previously active task is a task that was initiated but that was interrupted in response to an action by the CSA such as by navigating within the account view 102 to a page that is not part of the task. In FIG. 14, for example, the add funds task represented in FIG. 14 could potentially be interrupted if the CSA were to select the "Activate" control 1406 from the top of the account view 102, or any of the other controls in that same row.

The in-progress task list 1404 comprises hyperlinks to the most recently viewed pages of active tasks, including active processes that have been interrupted. In this example, the list 1404 includes a first item 1404(*a*), corresponding to the currently active "Refill Account" task. The first item 1404(*a*) also indicates that the CSA was most recently at "step 1" of the task. The list 1404 also includes a second item 1404(*b*), corresponding to a page of a different task, where the task in this case was an "Add New Line" task. The second item 1404(*b*) also indicates that the CSA was most recently at "step 4" of the "Add New Line" task.

The CSA may select any of the listed items to cause the account view 102 to navigate back to the indicated task and to the page corresponding to the indicated step of the task. The account view 102 maintains the state of in-progress and interrupted tasks, and when the user selects one of the listed items 104 the corresponding task is resumed with the saved state, without requiring the user to re-enter information that was already provided.

The in-progress task list 1404 allows the CSA to jump back and forth between tasks while talking with a customer without having to repeatedly start over. For example, given the example of FIG. 14, the CSA could navigate back to the "Add New Line" task by selecting the item 1404(*b*), complete the "Add New Line" task, and then move back to the partially completed "Refill Account" task by selecting the item 1404(*a*).

The in-progress task list 1404 is updated in real time as the user navigates within the account view 102. For example, upon selecting the "Add one-time payment" control 1408, the item 1404(*a*) is updated to read "Refill Account, Step 2." The in-progress task list 1404 is also updated in real time to reflect processes that are newly initiated in response to user navigation within the account view 102.

The quick links module pane 1402 also has a "favorites" list 1410, containing hyperlinks to different pages that are available in the account view 102. The favorites list 1410 is configurable by the user to list the pages that the user frequently accesses. The user can select any one of the listed hyperlinks, which in this case include hyperlinks 1410(*a*) and 1410(*b*), to navigate directly to a corresponding page within the customer interface. Each item of the list 1410 indicates a description or specification of the corresponding page. The list items are persistent with respect to the current user, and are therefore present regardless of which customer account has the focus of the account view 102.

The module panes described above are examples of various types of panes that may be used in a particular implementation. Different embodiments may have different module panes designed for different purposes. Generally, a module pane may contain any type of content, including graphics, video, active controls, active content, and so forth. When a module pane overlays the account view 102, the account view 102 remains active so that controls can be selected, information can be entered, and navigation can be performed. The module panes allow a CSA to concurrently look at several different types of content and to juggle different tasks, without necessarily leaving the current view that is presented by the account view 102.

Figure 15:
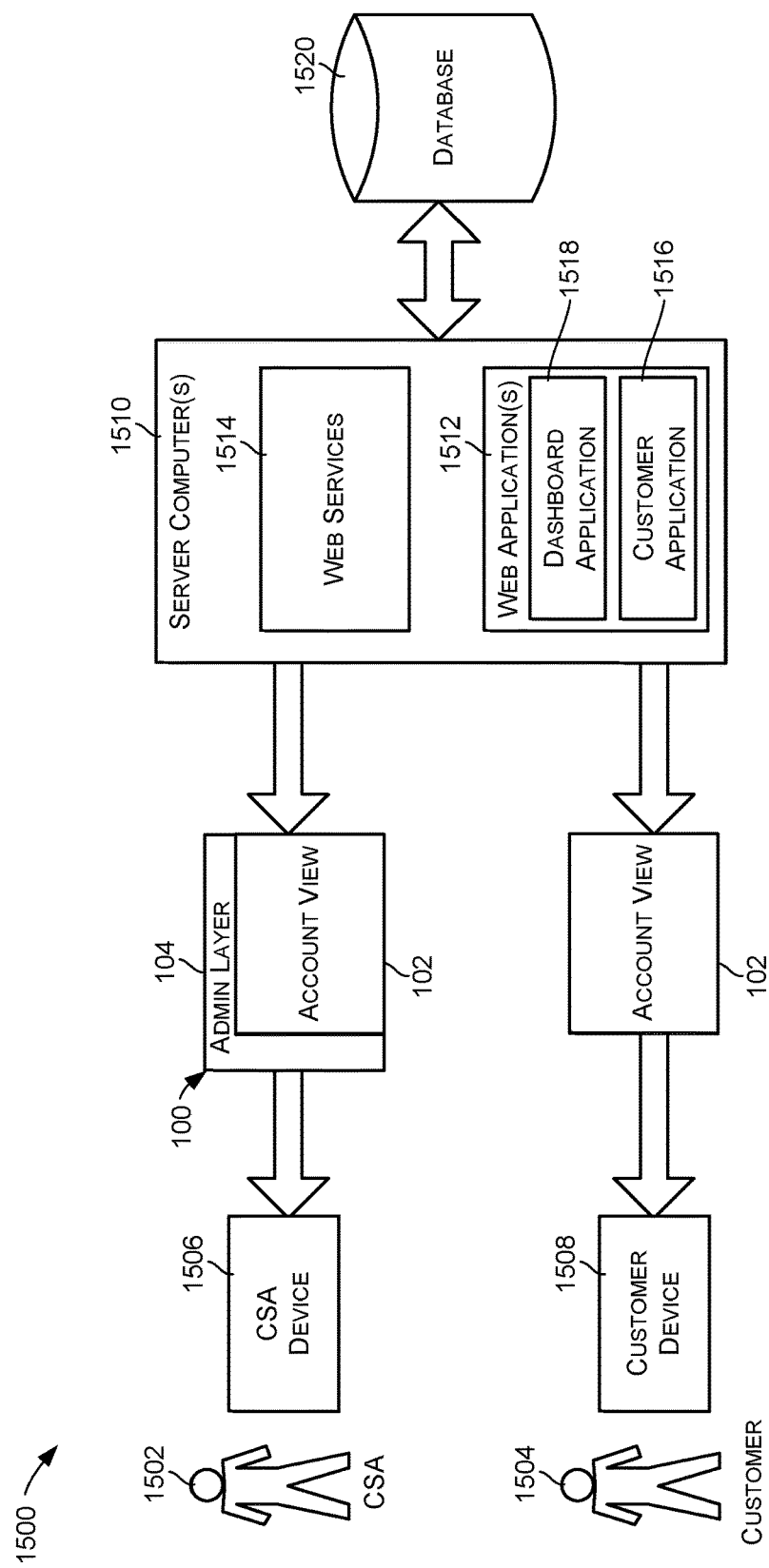
FIG. 15 is a block diagram illustrating an example environment in which the customer service dashboard of FIG. 1 may be implemented and used.

FIG. 15 illustrates an example environment or system 1500 in which the customer service dashboard 100 may be implemented. FIG. 15 illustrates different types of system users, which in this example comprise a CSA 1502 and a customer 1504. The CSA 1502 has an associated access device 1506 and the customer 1504 has an associated access device 1508. Each access device may comprise any sort of device having visual display capabilities, including hand-held devices such as tablet computers.

The illustrated CSA 1502 and customer 1504 are examples of multiple CSAs 1502 and multiple customers 1504 that may use the system 1500. CSAs may include retail agents who interact with customers in person, by telephone, or using text-based messaging applications. CSAs may also include support agents who work in service centers and who communicate with customers primarily using telephone or chat-based messaging mechanisms.

The access devices 1506 and 1508 communicate with a server 1510 over a wide-area network such as the Internet (not shown). In practice, the server 1510 may comprise multiple server instances, each of which may comprise a physical server or a virtual server. The server 1510 may be used to run one or more web applications 1512, using web services or REST APIs 1514 of the server computer 1510. A web application 1512 supports user interface instances for multiple client devices that communicate with the server 1510 over a network. A web application 1512 may include one or more programs as well as supporting data.

In the illustrated example, the server 1510 implements a customer interface web application 1516 and a dashboard web application 1518. The customer interface web application 1516 implements a website that exposes the account view 102 to the customer 1504. The dashboard web application 1518 implements a website that exposes the customer service dashboard 100 to the CSA 1502.

In order to provide functionality for managing customer accounts, the web applications 1516 and 1518 have access to a system database 1520 containing customer account data. In practice, the system database 1520 may comprise multiple data sources from which the web applications 1516 and 1518 may draw in order to generate content. The system database 1520 may be referred to as an accounts database or a customer information database in various embodiments.

The web application 1518 may be configured to generate and provide the customer service dashboard 100 by creating a composite view of the account view and the administrative layer 104. In some embodiments, the composite view may be created by embedding the account view as a frame within the dashboard 100.

In certain embodiments, the account view 102 as used in the dashboard 100 may comprise an instance of a customer facing portal that is generated by the customer interface web application 1516. FIG. 15 illustrates that the account view 102 may be available on its own to customers, without the surrounding administrative layer 104.

Figure 16:
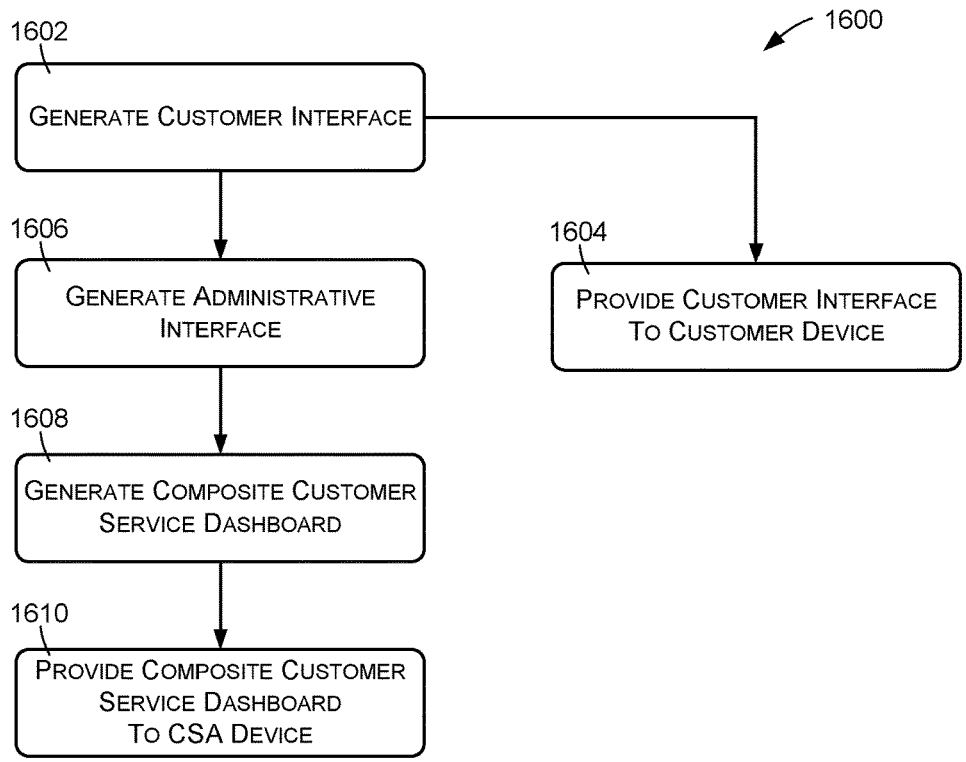
FIG. 16 is a flow diagram illustrating an example method of interacting with a customer service agent for managing an account of a customer.

FIG. 16 illustrates an example method 1600 of interacting with a customer service agent (CSA) for management of an account of a customer. The example method 1600 can be performed, for example, by the server(s) 1510 of FIG. 15, and/or by an application 1512 running on the server(s) 1510. In other embodiments, the method 1600 may be performed by an application that runs on any type of device, such as the portable or handheld device used by a CSA. Examples of such devices include smailphones, tablet computers, kiosks, desktop computers, etc. Such an application may be configured to generate the graphical user interfaces described herein, and may communicate with a server and/or database to access customer account information.

In the example of FIG. 16, an action 1602 comprises generating a graphical customer interface, such as the account view 102 described herein. The graphical customer interface may comprise multiple interlinked HTML documents containing content relating to an account of a customer. The HTML documents may include information, text, graphics, controls, etc., and may be used for presenting information to a customer and for obtaining information from the customer. The content may include navigational controls allowing the customer to navigate through the multiple documents of the graphical customer interface.

The graphical customer interface may in some cases be exposed as a website that is accessible to customers through the Internet. A customer may access the website using an HTML browser, for example. The website may authenticate the customer and may determine the account corresponding to the customer before allowing access to account data by the customer.

In certain embodiments, the graphical customer interface is designed primarily for customer use, having customer-focused content that relates to an account of the customer. The graphical customer interface may provide functionality for typical customer activities and interactions such as changing account characteristics, making payments, viewing previous transactions, and so forth. Certain administrative functions may be unavailable through the graphical customer interface, such as functions that can only be performed by CSAs.

An action 1604 comprises providing the graphical customer interface to a device used by a customer, for visible presentation by the customer device, allowing the customer to use the graphical customer interface for account management. The action 1604 may comprise providing HTML pages and content over a wide-area network such as the Internet, and presenting the customer-focused content in an HTML browser that runs on the customer device.

An action 1606 comprises generating a graphical administrative interface, such as the administrative layer 104 described herein. The graphical administrative interface may contain additional content relating to an account of a customer, including administrative content and content that is not generally part of the customer-focused content. The administrative interface may include information, text, graphics, controls, etc., and may be used for presenting information to a CSA and for obtaining information from the CSA.

An action 1608 comprises generating a customer service dashboard, where the customer service dashboard comprises a composite of the graphical customer interface and the graphical administrative interface. In certain embodiments, the graphical administrative interface may at least partially surround the graphical customer interface in the composite interface, and the graphical customer interface may be embedded as a frame or other element within the composite interface.

An action 1610 comprises providing the customer service dashboard to a device used by the CSA, for visible presentation by the CSA device, allowing the CSA to use the administrative interface for management of customer accounts.

Figure 17:
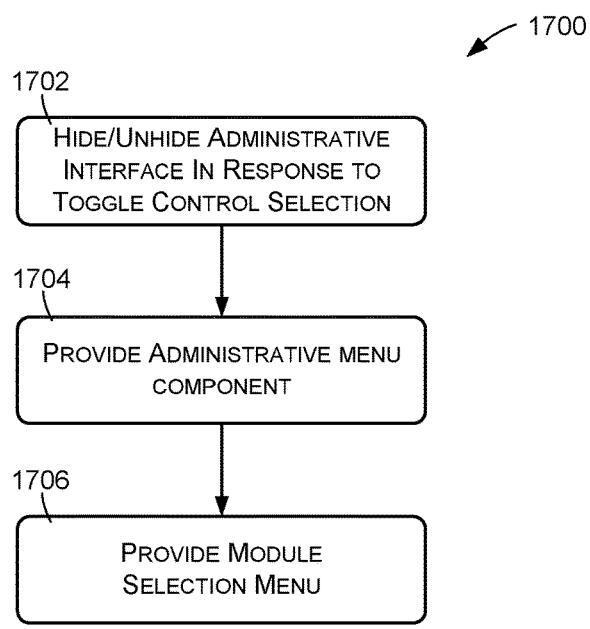
FIG. 17 is a flow diagram illustrating additional examples of techniques that may be implemented in conjunction with the example method of FIG. 16.

FIG. 17 illustrates an example method 1700, which includes techniques that may be performed in certain embodiments. The actions of the method 1700 relate to various aspects of the customer service dashboard described above with reference to FIG. 16, and to elements of the customer service dashboard that may be provided in certain embodiments.

An action 1702 comprises hiding or unhiding the graphical administrative interface from the customer service dashboard in response to selection of an administrative toggle control. The administrative toggle control may be provided as part of the customer service dashboard as a relatively small visual element, positioned unobtrusively such as in the upper left corner of the customer service dashboard. When the toggle control is selected, the graphical administrative interface is hidden, while leaving the graphical customer interface visible. When the toggle control is selected again, the graphical administrative interface is unhidden. When hiding the graphical administrative interface, the action 1702 may in some cases also include hiding certain content from the graphical customer interface, such as information that is not viewable by the customers themselves.

An action 1704 comprises providing an administrative menu component having selectable menu controls. When selected, each menu control opens an associated panel or pane that exposes functionality that is related primarily to the graphical administrative interface. For example, a panel may allow a CSA to lookup a particular customer account, to manage calendared tasks or reminders, and so forth. FIG. 1 shows an example of an administrative menu component, designed by the reference numeral 108.

An action 1706 comprises providing a module selection menu as part of the graphical administrative interface. The module selection menu, an example of which is shown in FIG. 1 designated by the reference numeral 114, comprises multiple controls that are individually selectable to open respectively corresponding module panes, wherein each mobile pane has content relating to the currently focused customer account. The module panes may overlay the graphical customer interface. More than one of the module panes can be open at the same time. Each module pane may be repositionable by the CSA relative to the graphical customer interface. Examples of module panes include: a cost summary pane; a memo pane; a reminder pane; an activity log pane; and a quick links pane.

Figure 18:
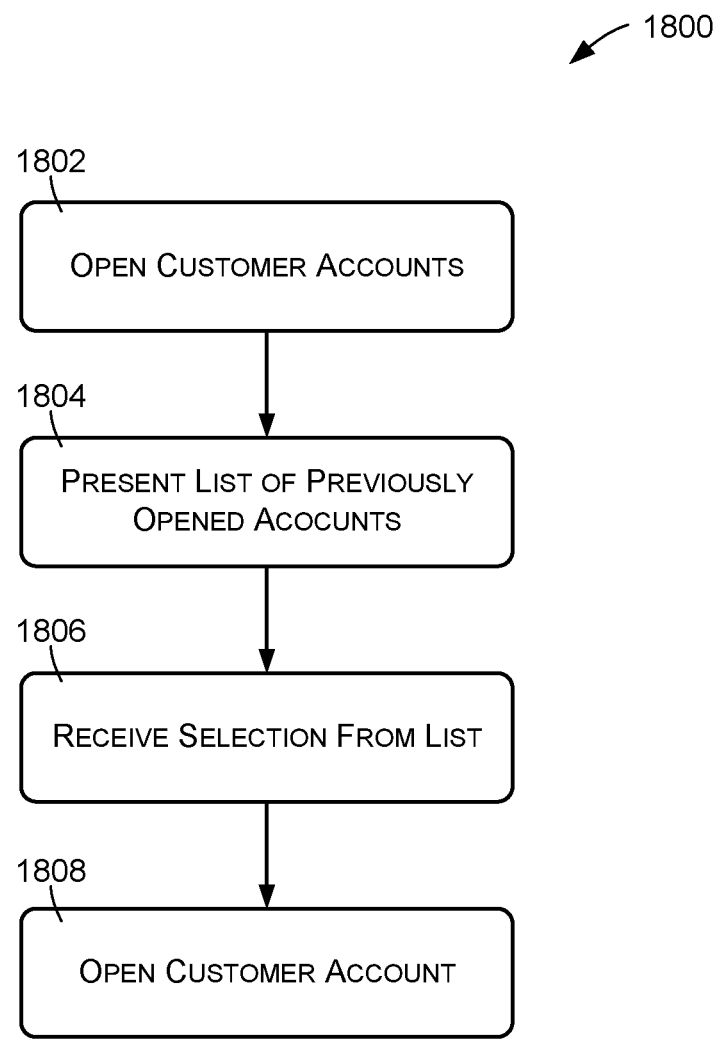
FIG. 18 is a flow diagram illustrating an example method of interacting with a customer service agent to navigate between multiple customer accounts.

FIG. 18 illustrates an example method 1800 of interacting with a CSA to manage a customer account, and in particular of allowing a CSA to work with multiple customer accounts and to quickly switch between open accounts. The method 1800 can be performed by or in conjunction with one or more of the panels or panes of the administrative menu component, as an example. Specifically, the menu controls may provide one or more panels that provide the functionality illustrated by FIG. 18.

An action 1802 comprises interacting with a CSA or other user through the customer service dashboard to receive identifications of multiple customer accounts to be opened in the graphical customer interface. The action 1802 may include opening multiple user accounts at different times, where a single customer account is in focus by the customer service dashboard at any given time. While one customer account is open, the CSA may open another customer account, which is then given focus. The previous customer account may nonetheless remain open, meaning that the CSA remains logged into the account.

Accounts may be opened by interacting with the graphical customer interface portion of the customer service dashboard or by interacting through various components of the graphical administrative interface.

An action 1804 comprises, in response to the CSA selecting a control of the graphical administrative interface that has been designated for this purpose, presenting list of open or previously open accounts. For a list of such customer accounts may be presented in a fly-out panel of the administrative menu component as illustrated in FIG. 4.

An action 1806 comprises receiving a selection from the list, such as a selection by the CSA, of one of the listed multiple customer accounts, indicating that the CSA wishes for that customer account to receive the focus of the customer service dashboard.

An action 1808 comprises, in response to receiving the selection, opening the selected one of the multiple customer accounts in the graphical customer interface. This gives the focus of the customer service dashboard to the selected customer account. In some embodiments, the customer account may be opened to the page of the graphical customer interface that was last viewed in the context of the selected customer account.

Figure 19:
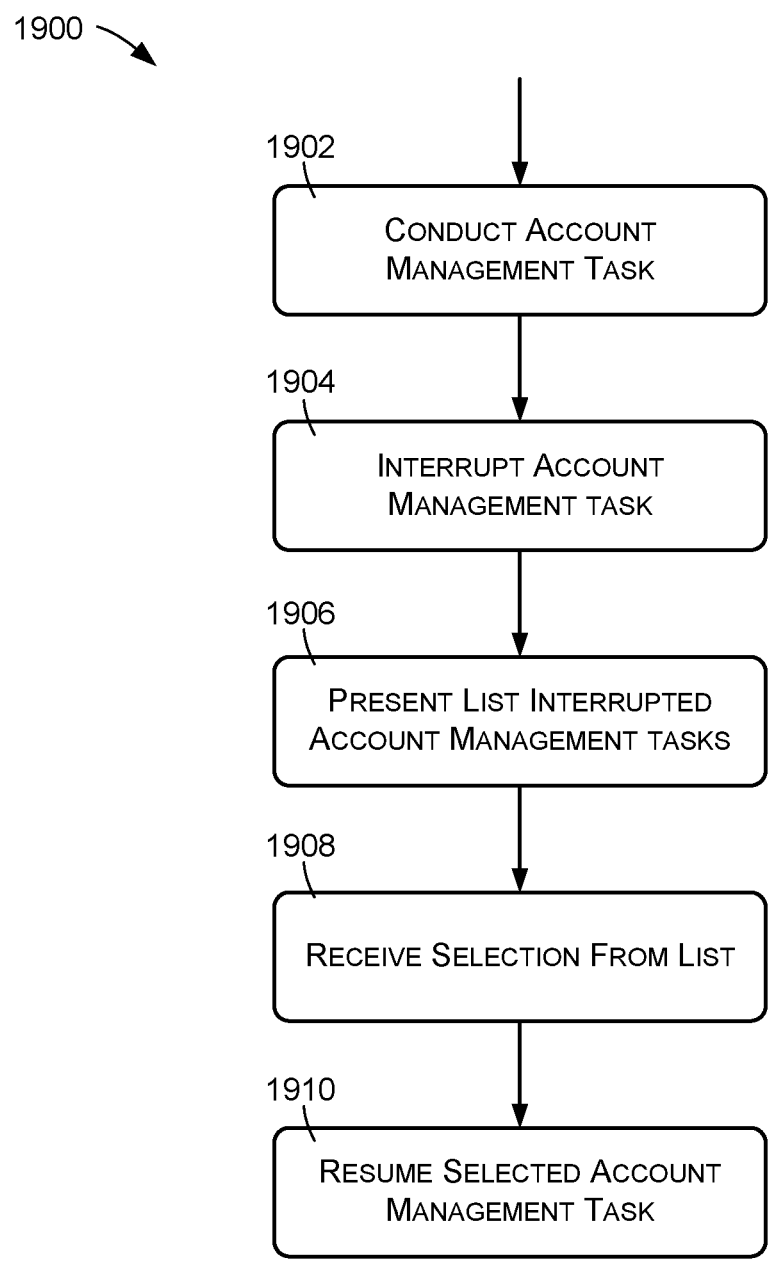
FIG. 19 is a flow diagram illustrating an example method of interacting with a customer service agent to navigate between in-progress tasks.

FIG. 19 illustrates an example method 1900 of interacting with a CSA to manage a customer account, and in particular of allowing a CSA to work with multiple tasks and to quickly resume interrupted tasks. The method 1900 may be implemented for example within a module pane, such as the module pane 1402 of FIG. 14.

An action 1902 comprises interacting with the CSA through the graphical customer interface, also referred to herein as the account view, to conduct a first part of a multi-step account management task. As an example, a multi-step account management task may be conducted through the graphical customer interface using multiple pages that are displayed in a sequence within the graphical customer interface, where each page corresponds to a step of the task.

An action 1904 comprises interrupting the multi-step account management task in response to an action by the CSA. For example, the task may be interrupted when the CSA navigates within the graphical customer interface to a different task or to a different part of the graphical customer interface, without finishing the steps or pages of the original task. When a task is interrupted in this manner, the graphical customer interface saves the state of the original task so that the original task can be later resumed without requiring the user to re-enter previously entered information.

An action 1906 comprises presenting a list of one or more interrupted multi-step account management tasks. For example, such a list may be presented in a "quick links" module pane as described above with reference to FIG. 14.

An action 1908 comprises receiving a selection from the list, by the CSA, of one of the listed account management tasks.

An action 1910 comprises, in response to receiving the selection, resuming the selected account management task. This may comprise presenting, in the graphical customer interface, one of the multiple pages of the multi-step task that was being presented in the graphical customer management interface at the time that the multi-step account management task was interrupted. The graphical customer interface may then continue to interact with the CSA through the graphical customer interface to conduct a second or continuing part of the multi-step account management task. Information previously entered for the first part of the task is remembered, so that the CSA does not need to re-enter this information.

Figure 20:
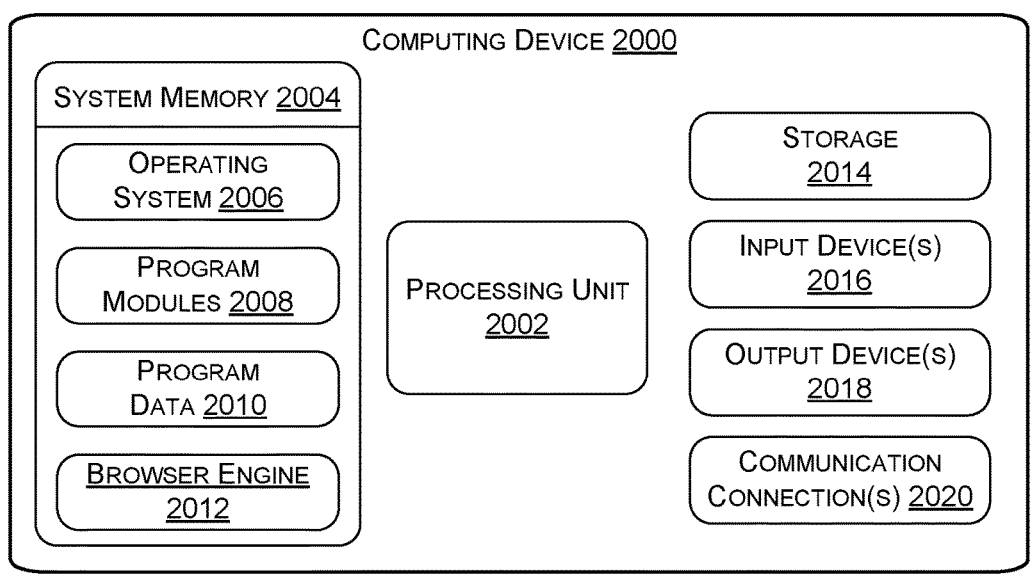
FIG. 20 is a block diagram illustrating an example device that may be used at least in part to implement the customer service dashboard of FIG. 1.

FIG. 20 is a block diagram of an illustrative computing device 2000 such as may be used to implement the techniques described herein. The computing device 2000 may comprise a server, which may be used as one of multiple servers of a system that implements the described techniques. Alternatively, the computing device 2000 may be a local or portable device such as a desktop computer, terminal, or handheld device.

In various embodiments, the computing device 2000 may include at least one processing unit 2002 and system memory 2004. Depending on the exact configuration and type of computing device, the system memory 2004 may be volatile (such as RAM), non-volatile (such as ROM, flash memory, etc.) or some combination of the two. The system memory 2004 may include an operating system 2006, one or more program modules 2008, and may include program data 2010. The system memory 2004 may also include a web browser engine 2012 for rendering HTML web pages.

The computing device 2000 may also include additional data storage devices (removable and/or non-removable) such as, for example, magnetic disks, optical disks, or tape. Such additional storage is illustrated in FIG. 20 by storage 2014.

Non-transitory computer storage media of the computing device 2000 may include volatile and nonvolatile, removable and non-removable media implemented in any method or technology for storage of information, such as computer readable instructions, data structures, program modules, or other data. The system memory 2004 and storage 2014 are all examples of computer-readable storage media. Non-transitory computer-readable storage media includes, but is not limited to, RAM, ROM, EEPROM, flash memory or other memory technology, CD-ROM, digital versatile disks (DVD) or other optical storage, magnetic cassettes, magnetic tape, magnetic disk storage or other magnetic storage devices, or any other medium which can be used to store the desired information and which can be accessed by computing device 2000. Any such non-transitory computer-readable storage media may be part of the computing device 2000.

In various embodiment, any or all of the system memory 2004 and storage 2012 may store programming instructions which, when executed, implement some or all of the function functionality described above as being implemented by components of the CSA device 1506, the customer device 1508, and/or the server computers(s) 1510.

The computing device 2000 may also have input device(s) 2016 such as a keyboard, a mouse, a touch-sensitive display, voice input device, etc. Output device(s) 2018 such as a display, speakers, a printer, etc. may also be included. The computing device 2000 may also contain communication connections 2020 that allow the device to communicate with other computing devices.

Although features and/or methodological acts are described above, it is to be understood that the appended claims are not necessarily limited to those features or acts. Rather, the features and acts described above are disclosed as example forms of implementing the claims.

What is claimed is:

1. A method of interacting with a customer service agent for managing an account of a customer, comprising:
   generating a graphical customer interface, the graphical customer interface having first content relating to the account of the customer;
   providing the graphical customer interface to a first device used by the customer for visible presentation by the first device, the graphical customer interface being used by the customer to manage the account of the customer;
   generating a graphical administrative interface, the graphical administrative interface having second content relating to the account of the customer, the second content including administrative content that is not part of the first content;
   providing a module selection menu as part of the graphical administrative interface, the module selection menu having multiple controls that are individually selectable to open respectively corresponding module panes, each module pane having content relating to the account of the customer, and a first module pane of the module panes presenting a list of one or more interrupted multi-step account management tasks that includes an indication of a most recently completed step of the one or more interrupted multi-step account management tasks;
   generating a customer service dashboard comprising a composite of the graphical customer interface and the graphical administrative interface;
   providing the customer service dashboard to a second device used by the customer service agent for visible presentation by the second device;
   interacting with the customer service agent through the graphical customer interface to conduct at least part of a multi-step account management task;
   interrupting the multi-step account management task in response to an action by the customer service agent;
   receiving a selection from the list, by the customer service agent, of the multi-step account management task; and
   in response to receiving the selection, resuming the multi-step account management task in the graphical customer interface.

2. The method of 1, the customer service dashboard having a toggle control, the method further comprising:
   in response to selection of the toggle control by the customer service agent, hiding the graphical administrative interface while leaving the graphical customer interface visible.

3. The method of 1, wherein the graphical administrative interface at least partially surrounds the graphical customer interface in the composite graphical interface.

4. The method of 1, further comprising:
   interacting with the customer service agent through the customer service dashboard to receive identifications of multiple customer accounts to be opened in the graphical customer interface;
   presenting, in the graphical administrative interface, a list of multiple customer accounts that have been previously opened but not yet closed or logged out of;
   receiving a selection from the list, by the customer service agent, of one of the multiple customer accounts; and
   in response to receiving the selection, opening the selected one of the multiple customer accounts in the graphical customer interface.

5. The method of 1, wherein
   an individual one of the module panes overlays the graphical customer interface and is repositionable by the customer service agent relative to the graphical customer interface.

6. The method of 5, wherein more than one of the module panes can be open at the same time.

7. The method of 5, wherein the module panes comprise one or more of:
   a cost summary pane;
   a memo pane;
   a reminder pane;
   an account usage pane; or
   an activity log pane.

8. The method of 5, wherein each of the graphical customer interface and the graphical administrative interface layer remain active for interaction with the customer service agent while the individual one of the module panes is open.

9. The method of claim 1, wherein the module selection menu comprises first multiple controls, and further comprising second multiple controls that are unrelated to the account of the customer, the second multiple controls being spatially separated from the first multiple controls as presented on the graphical administrative interface.

10. The method of claim 9, wherein the first multiple controls are presented as a column of selectable elements on the graphical administrative interface, and the second multiple controls are presented as a row of selectable elements on the graphical administrative interface.

11. One or more non-transitory computer-readable media storing computer-executable instructions that, when executed by the one or more processors, cause the one or more processors to perform actions comprising:
   generating an account view, wherein the account view at least partially replicates a graphical customer interface that is accessible to a customer for management of an account of the customer, the account view having first content relating to the account;
   generating a graphical administrative layer, the graphical administrative layer having second content relating to the account, the second content including administrative content that is not part of the first content;
   generating a customer service interface comprising a composite of the account view and the graphical administrative layer;
   providing the customer service interface for presentation by a device associated with a customer service agent to allow the customer service agent to manage the account;
   presenting, in the graphical administrative layer, a list of one or more interrupted multi-step account management tasks that indicates a most recently completed step of the one or more interrupted multi-step account management tasks;

interacting with the customer service agent through the account view to conduct a first part of a multi-step account management task;

interrupting the multi-step account management task in response to an action by the customer service agent;

receiving a selection from the list, by the customer service agent, of the multi-step account management task; and in response to receiving the selection, continuing to interact with the customer service agent through the account view to conduct a second part of the multi-step account management task.

12. The one or more non-transitory computer storage media of claim 11, the customer service interface having a toggle control, the actions further comprising:

In response to selection of the toggle control by the customer service agent, hiding the graphical administrative layer while leaving the account view visible.

13. The one or more non-transitory computer storage media of claim 11, wherein the graphical administrative layer at least partially surrounds the account view.

14. The one or more non-transitory computer storage media of claim 11, wherein:

the multi-step account management task is conducted using multiple pages that are displayed in a sequence within the account view; and resuming the multi-step account management task comprises presenting, in the account view, one of the multiple pages that was being presented in the account view at the time that the multi-step account management task was interrupted.

15. The one or more non-transitory computer storage media of claim 11, the actions further comprising:

providing a module selection menu as part of the graphical administrative layer, the module selection menu having multiple controls that are individually selectable to open respectively corresponding module panes, each module pane having content relating to the account; and wherein more than one of the module panes can be open at the same time, each open module pane overlaying the account view and being repositionable relative to the account view; and wherein the account view and the graphical administrative layer remain active for interaction with the customer service agent while one or more of the module panes are open.

16. A system comprising:

one or more processors;

one or more non-transitory computer-readable media storing computer-executable instructions that, when executed by the one or more processors, cause the one or more processors to perform actions comprising:

generating an account view, the account view having first content relating to an account of a customer;

providing the account view to a first device used by the customer for visible presentation by the first device;

generating a graphical administrative layer, the graphical administrative layer having second content relating to the account, the second content including administrative content that is not part of the first content;

generating a customer service interface comprising a composite of the account view and the graphical administrative layer, wherein the graphical administrative layer at least partially surrounds the account view;

providing the customer service interface for presentation by a device associated with a customer service agent to allow the customer service agent to manage the account;

presenting, in the graphical administrative layer, a list of one or more interrupted multi-step account management tasks that indicates a most recently completed step of the one or more interrupted multi-step account management tasks;

interacting with the customer service agent through the account view to conduct a first part of a multi-step account management task;

interrupting the multi-step account management task in response to an action by the customer service agent;

receiving a selection from the list, by the customer service agent, of the multi-step account management task; and in response to receiving the selection, continuing to interact with the customer service agent through the account view to conduct a second part of the multi-step account management task.

17. The system of claim 16, the customer service interface having a toggle control, the actions further comprising:

In response to selection of the toggle control by the customer service agent, hiding the graphical administrative layer while leaving the account view visible.

18. The system of claim 16, wherein:

the multi-step account management task is conducted using multiple pages that are displayed in a sequence within the account view; and resuming the multi-step account management task comprises presenting, in the account view, one of the multiple pages that was being presented in the account view at the time that the multi-step account management task was interrupted.

19. The system of claim 16, the actions further comprising:

providing a module selection menu as part of the graphical administrative layer, the module selection menu having multiple controls that are individually selectable to open respectively corresponding module panes, each module pane having content relating to the account;

wherein more than one of the module panes can be open at any time, each open module pane overlaying the account view and being repositionable by the customer service agent relative to the account view; and wherein the account view and the graphical administrative layer remain active for interaction with the customer service agent while one or more of the module panes are open.

20. The system of claim 19, wherein at least one open module pane is repositionable by the customer service agent via dragging the at least one module pane across the account view.

* * * * *